(12) United States Patent
Trivedi et al.

(10) Patent No.: US 11,604,463 B1
(45) Date of Patent: Mar. 14, 2023

(54) SYSTEM AND METHOD FOR ADJUSTING VEHICLE LOCATION

(71) Applicant: Ridecell, Inc., San Francisco, CA (US)

(72) Inventors: Aarjav Trivedi, Berkeley, CA (US); ArunKumar Elangovan, Walnut Creek, CA (US); Samyak Pandya, San Francisco, CA (US); Jit Ray Chowdhury, Sunnyvale, CA (US); Srinivas Reddy Aellala, San Francisco, CA (US)

(73) Assignee: Ridecell, Inc., San Francisco, CA (US)

( * ) Notice: Subject to any disclaimer, the term of this patent is extended or adjusted under 35 U.S.C. 154(b) by 327 days.

(21) Appl. No.: 16/555,540

(22) Filed: Aug. 29, 2019

Related U.S. Application Data

(60) Provisional application No. 62/727,604, filed on Sep. 6, 2018.

(51) Int. Cl.
    *G05D 1/00* (2006.01)
    *G06F 16/29* (2019.01)
    *G01C 21/36* (2006.01)
    *G05D 1/02* (2020.01)

(52) U.S. Cl.
    CPC ....... *G05D 1/0027* (2013.01); *G01C 21/3605* (2013.01); *G05D 1/0088* (2013.01); *G05D 1/0217* (2013.01); *G06F 16/29* (2019.01)

(58) Field of Classification Search
    None
    See application file for complete search history.

(56) References Cited

U.S. PATENT DOCUMENTS

| | | | |
|---|---|---|---|
| 2016/0334797 A1* | 11/2016 | Ross | G01C 21/3484 |
| 2018/0321050 A1* | 11/2018 | Chase | G06N 20/00 |
| 2018/0342035 A1* | 11/2018 | Sweeney | G05D 1/0088 |
| 2019/0011931 A1* | 1/2019 | Selvam | G08G 1/202 |
| 2019/0196503 A1* | 6/2019 | Abari | G06Q 10/00 |
| 2019/0266897 A1* | 8/2019 | Turato | G06Q 30/0645 |

OTHER PUBLICATIONS

Shaheen et al., "Autonomous Carsharing/Taxi Pathways", Jul. 18, 2014, Envisioning Automated Vehicles within the Built Environment-Ancillary Workshop to the TRB Automated Vehicles Symposium (Year: 2014).*

* cited by examiner

*Primary Examiner* — Tamara L Weber
(74) *Attorney, Agent, or Firm* — Larry E. Henneman, Jr.; Henneman & Associates, PLC

(57) ABSTRACT

Systems and methods for repositioning autonomous vehicles are disclosed. The systems and methods facilitate moving vehicles of a fleet of vehicles into more advantageous locations. For example, autonomous vehicles can be moved from positions where a vehicle would be difficult to access by a user and/or be less likely to be used by a user to positions that provide easier access by a user and/or make the vehicle more likely to be used.

19 Claims, 7 Drawing Sheets

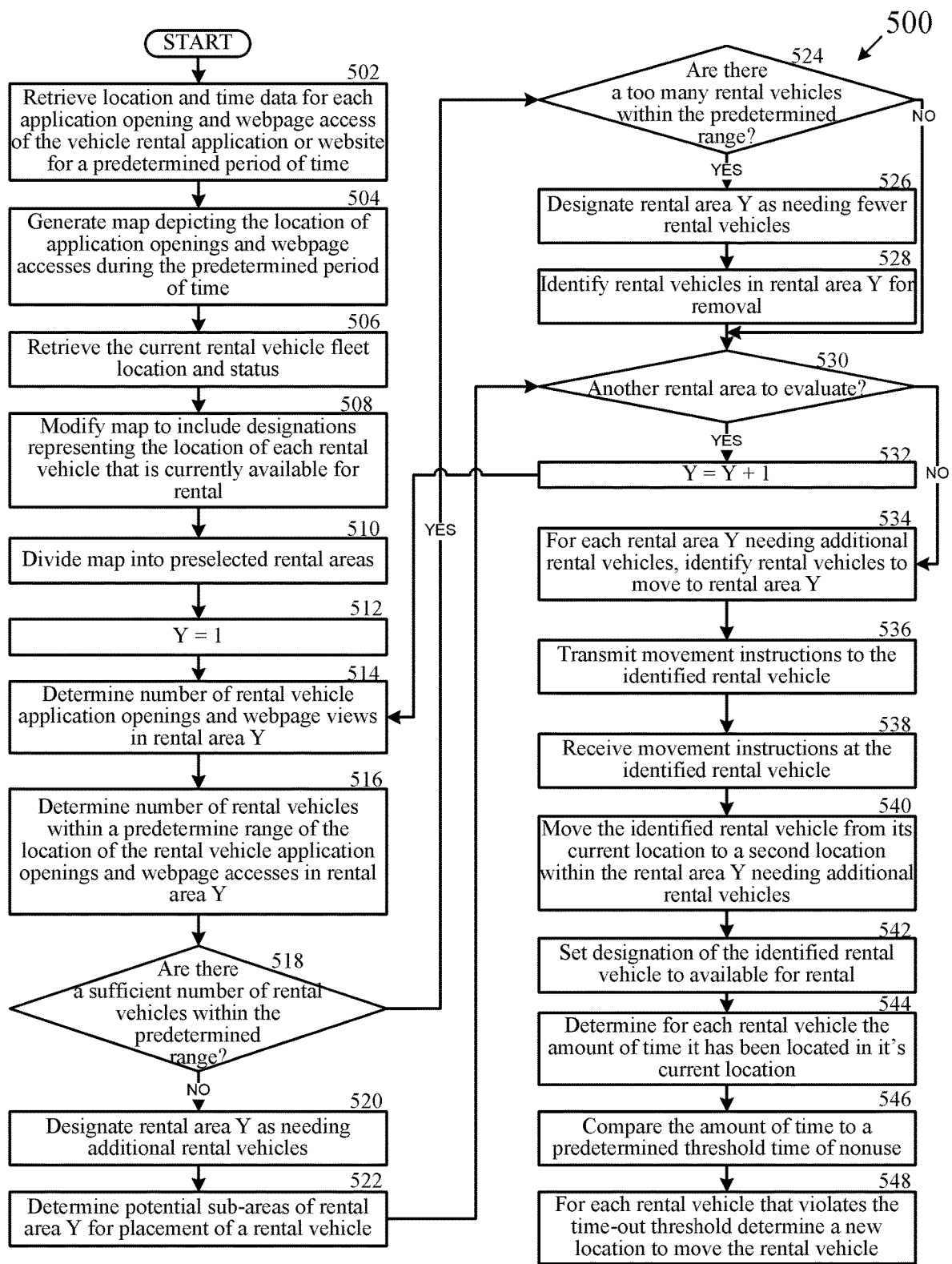
FIG. 5A  Go to Block 550, Fig. 5B

SYSTEM AND METHOD FOR ADJUSTING VEHICLE LOCATION

CROSS-REFERENCE TO RELATED APPLICATIONS

This application claims the benefit of U.S. Provisional Patent Application Ser. No. 62/727,604, filed on Sep. 6, 2018 by at least one common inventor and entitled "System And Method For Adjusting Vehicle Location", which is incorporated by reference herein in its entirety.

FIELD OF THE INVENTION

This invention relates generally to autonomous vehicles. In particular, this invention relates to systems and methods for repositioning autonomous vehicles.

BACKGROUND

Customers are more willing and able to rent a vehicle (e.g., car, truck, van, motorcycle, etc.) when the vehicle is more accessible to them. Unfortunately, conventional vehicle rental businesses are typically located at airports or at a large centralized location in the business district of a city. These locations are typically far from where the person wanting to rent the vehicle is located. This can result in the person having to find a mode of travel to the vehicle rental business in order to rent the vehicle. It would be beneficial to the rental process if vehicles were located closer to where the people who want to rent them are located.

However, even if vehicles are initially positioned at a location close to where the prospective renter is located, it is unlikely to remain there once it has been rented. In many instances the prospective renter will rent the vehicle at one location and leave it at a second location. This second location may not be near where other prospective renters are located.

SUMMARY

Systems and methods for repositioning autonomous vehicles are disclosed. The systems and methods facilitate moving vehicles of a fleet of vehicles into more advantageous locations. For example, autonomous vehicles can be moved from positions where a vehicle would be difficult to access by a user and/or be less likely to be used by a user to positions that provide easier access by a user and/or make the vehicle more likely to be used.

Example methods for relocating autonomous vehicles available for use by certain individuals are disclosed. One example method includes establishing a network connection with each autonomous vehicle of a plurality of said autonomous vehicles, and receiving vehicle location information associated with each autonomous vehicle of the plurality of autonomous vehicles via the network connections. The example method additionally includes defining a first geographical region, determining a demand for the autonomous vehicles within the first geographical region, determining a first number of the autonomous vehicles that are available within the first geographical region, and determining whether the first number of the autonomous vehicles corresponds to the demand for the autonomous vehicles within the first geographical region. Determining the first number of available autonomous vehicles is based at least in part on the vehicle location information.

If the first number of the autonomous vehicles available within the first geographical region does not correspond (e.g., higher or lower than an acceptable range) to the demand for the autonomous vehicles within the first geographical region, movement instructions are communicated to a particular one of the autonomous vehicles, via a particular one of the network connections. The movement instructions cause the particular one of the autonomous vehicles to move into or out of the first geographical region. The movement of the autonomous vehicle changes the first number of the autonomous vehicles available within the first geographical region to a second number of the autonomous vehicles available within the first geographical region. The movement of the autonomous vehicle is calculated to make the second number of the available autonomous vehicles in the first geographical region correspond more closely to the demand for the autonomous vehicles within the first geographical region than the first number of the available autonomous vehicles in the first geographical region.

In a particular example method, the step of determining the demand for the autonomous vehicles within the first geographical region includes establishing a plurality of network connections with a plurality of user devices and receiving user location information from the user devices. Each of the user devices is associated with a respective one of the certain individuals authorized to use the autonomous vehicles. The user location information is indicative of a current location of an accessing one of said user devices and is received each time one of the user devices accesses a server associated with the autonomous vehicles. The particular example method additionally includes determining, from the user location information, a number of times that the server is accessed from within the first geographical region, and determining a demand for the autonomous vehicles within the first geographical region based at least in part on the number of times that the server is accessed within the first geographical region.

The example method optionally includes receiving preference information associated with particular ones of the certain individuals associated with the user location information, and determining the demand for the autonomous vehicles within the first geographical region includes determining a demand for autonomous vehicles having a particular characteristic based at least in part on the preference information. As another option, the example method includes receiving time information associated with particular ones of the certain individuals associated with the user location information, and determining the demand for the autonomous vehicles within the first geographical region includes determining a demand for autonomous vehicles during a particular time period based at least in part on the time information. In one example method, the particular time period is a recurring time period.

Another particular example method further includes dividing a larger geographical region into a plurality of smaller geographical regions including the first geographical region, and determining from the user location information a demand for autonomous vehicles within each geographical region of the plurality of geographical regions. An available number of the autonomous vehicles within each geographical region of the plurality of geographical regions is determined from the vehicle location information. The method additionally includes determining whether, within each particular geographical region of the plurality of geographical regions, the available number of the autonomous vehicles within each particular geographical region corresponds to the demand for the autonomous vehicles within that particular geographical region. A first subset of the plurality of geographical regions in which the available number of the autonomous vehicles is insufficient to meet the demand for the autonomous vehicles is identified, and a subset of the autonomous vehicles to relocate to at least one geographical region of the identified subset of the plurality of geographical regions is also identified. The example method additionally includes communicating movement instructions to the autonomous vehicles of the subset of autonomous vehicles to cause the autonomous vehicles of the subset of autonomous vehicles to move into one of the geographical regions of the first subset of geographical regions. The example method additionally includes identifying a second subset of the plurality of geographical regions in which the available number of the autonomous vehicles exceeds the demand for the autonomous vehicles, and the step of identifying a subset of the autonomous vehicles to relocate to the first subset of the plurality of geographical regions includes selecting ones of the autonomous vehicles from within the second subset of geographical regions.

One or more of the example methods can also include receiving a request for an autonomous vehicle at a particular location, and determining whether there is an available autonomous vehicle within a predetermined distance of the particular location. If there is not an available autonomous vehicle within a predetermined distance of the particular location, the method includes communicating movement instructions to a selected available one of the autonomous vehicles. The movement instructions cause the selected available one of the autonomous vehicles to move to a new location within the predetermined distance of the particular location. Optionally, the step of receiving a request for an autonomous vehicle at a particular location can include receiving a request for an autonomous vehicle at a particular time, and the movement instructions can cause the selected available one of the autonomous vehicles to move to the new location within a predetermined time period prior to the particular time. As another option, the step of receiving a request for an autonomous vehicle at a particular location can include receiving a request for an autonomous vehicle having a particular characteristic, and the selected available one of the autonomous vehicles can be selected based at least in part on the particular characteristic.

Another example method for relocating an autonomous vehicle (e.g., moving vehicle closer to a user) includes establishing a network connection with at least one user device, and receiving a request for an autonomous vehicle from the at least one user device via the network connection. The request can include location information associated with the at least one user device, and a particular location can determined based on the location information. The example method additionally includes identifying available autonomous vehicles within a first predetermined distance of the particular location, selecting a particular one of the identified available autonomous vehicles, establishing a network connection with the selected autonomous vehicle, and providing relocation instructions to the selected autonomous vehicle via the network connection. The relocation instructions cause the autonomous vehicle to relocate to a new location within a second predetermined distance of the particular location, and the second predetermined distance is shorter than the first predetermined distance. Optionally, responsive to receiving the request for an autonomous vehicle, a graphical representation of available autonomous vehicles within the first predetermined distance of the particular location can be provided to the user device, and the step of selecting a particular one of the identified available autonomous vehicles can include receiving information indicative of a selection of the particular one of the available autonomous vehicles from the user device.

In an example method, the step of identifying available autonomous vehicles within the first predetermined distance of the particular location includes identifying a set of autonomous vehicles within the first predetermined distance of the particular location, and then identifying a subset of available autonomous vehicles from the set of autonomous vehicles. The example method can further include modifying a status indicator of the selected autonomous vehicle to indicate that the selected autonomous vehicle is no longer available.

In an example method, the step of receiving a request for an autonomous vehicle from the at least one user device includes receiving a request for an autonomous vehicle having a particular characteristic. The step of identifying a subset of available autonomous vehicles from the set of autonomous vehicles can then include identifying a subset of available autonomous vehicles having the particular characteristic. By way of non-limiting example, the particular characteristic can be a class of the available autonomous vehicles. As another example, the particular characteristic can be a particular feature of the available autonomous vehicles.

Optionally, the location information associated with the at least one user can be GPS data received from the user device. As another option, the location information associated with the at least one user can entered by the user of the user device.

In an example method, the request for an autonomous vehicle can specify a particular time period for renting the at least one autonomous vehicle, and the step of providing relocation instructions to the selected autonomous vehicle can includes providing relocation instructions that cause the autonomous vehicle to relocate to the new location within a predetermined time period prior to a starting time of the particular time period.

An example computer-implemented method includes receiving, by a vehicle location control computer, location information comprising at least one location for a plurality of application openings by a plurality of third-party user devices. The example method additionally includes receiving, by the vehicle location control computer, a current location for each of a plurality of vehicles, determining, by the vehicle location control computer, a first vehicle that is closest to a first location of the at least one location for the plurality of application openings, determining, by the vehicle location control computer, a first distance of the first vehicle from the first location, and determining, by the vehicle location control computer, if the first distance is greater than a threshold distance. The example method additionally includes transmitting, by the vehicle location control computer to a second vehicle of the plurality of vehicles, movement instructions to move the second vehicle. The movement instructions are configured to autonomously move the second vehicle to a second location within the threshold distance of the first location. The example computer-implemented method can also include receiving, by a vehicle computer at the second vehicle, the movement instructions, determining, by the vehicle computer, a path to move the second vehicle from the current location of the second vehicle to the second location, driving autonomously, by the vehicle computer, the second vehicle from the current location to the second location. Sometimes, the first vehicle and the second vehicle can be the same.

Another example computer-implemented method includes determining that a first rental vehicle has been in a first location for a first time period by a vehicle location control computer, determining that the first time period is greater than a threshold time period by the vehicle location control computer, and receiving location information comprising at least one second location corresponding to a plurality of application openings by a plurality of third-party user devices by a vehicle location control computer. The example method additionally includes determining, by the vehicle location control computer, that the second location has an under capacity of rental vehicles, and transmitting, by the vehicle location control computer to the first rental vehicle, movement instructions to move the first rental vehicle. The movement instructions are configured to autonomously move the first rental vehicle within a threshold distance of the second location. The example method can additionally include receiving the movement instructions by a vehicle computer at the first rental vehicle, and driving the first rental vehicle autonomously from the first location to the second location by the vehicle computer.

Another example computer-implemented method includes determining, by a vehicle location control computer, that a rental period for a first rental vehicle is about to end, determining, by the vehicle location control computer, a first location to end the rental period, and transmitting, by the vehicle location control computer to a renter of the first rental vehicle, a notification to leave the first rental vehicle at the first location at the end of the rental period. The example method additionally includes receiving, by the vehicle location control computer from the first rental vehicle, location data indicating the first rental vehicle is at the first location, and providing, by the vehicle location control computer to the renter, a discount or coupon.

BRIEF DESCRIPTION OF THE DRAWINGS

FIGS. 5A-5B are an example process flow diagram for adjusting vehicle location in accordance with one example embodiment of the disclosure.

Figure 1:
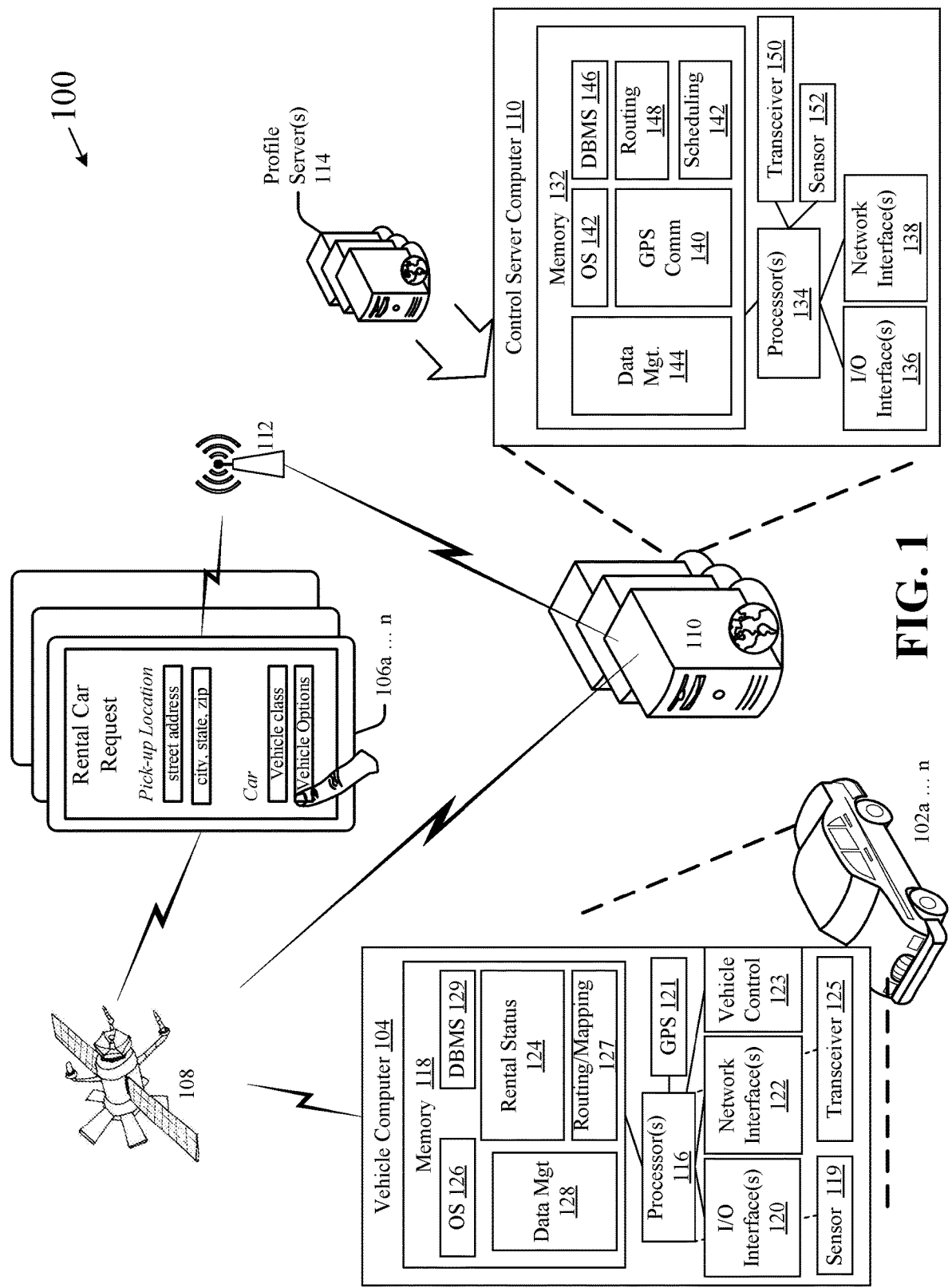
FIG. 1 is a system for adjusting vehicle location in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF EXAMPLE EMBODIMENTS

Overview

Being able to move vehicles, e.g. autonomously, into locations where they are more likely to be rented, can improve the rental process for the prospective renter and increase the amount of time a vehicle is rented for the vehicle rental business. This disclosure relates to, among other things, systems, methods, computer-readable media, techniques and methodologies for evaluating rental vehicle locations and autonomously adjusting the location of specific rental vehicles based on anticipated demand and/or historical demand data. The systems and methods described herein are directed to autonomously adjusting the location of rental vehicles (e.g., cars, trucks, vans, motorcycles, etc.) in a rental vehicle fleet in order to place the vehicle at or near a location of perceived rental vehicle demand. In some embodiments, the system may determine the location and status of rental vehicles in a rental vehicle fleet. Although described with respect to a rental vehicle, the present invention can be utilized to monitor and adjust the location of many types of vehicles, including fleets of utility/maintenance vehicles, shipping vehicles, etc. The vehicles may include previously piloted vehicles that have been retrofitted with hardware, software, and/or firmware to allow the vehicle to be autonomously controlled. The system may additionally track and monitor the location and timing of prospective renters opening a vehicle rental application (or an application that provides the ability to rent a vehicle). The system may determine if any vehicle or a certain number of vehicles are near to an area where a predetermined number of prospective renters have opened the vehicle rental application over a predetermined amount of time to determine if additional vehicles need to be moved to that area or if vehicles need to be moved out of that area due to an overabundance based on projected demand. The system may then determine a particular location to move one or more rental vehicles in the fleet and may transmit instructions to those particular rental vehicle as to where and when to move the vehicle. The rental vehicle may then be moved to the area identified by the system. In one or more examples, the vehicle is moved autonomously without the assistance of a driver inside the vehicle.

Illustrative System Architecture

FIG. 1 is an example system 100 for adjusting vehicle location in accordance with one or more embodiments of the disclosure. Referring to FIG. 1, the example system 100 can include a vehicle location control server(s) 110. The vehicle location control server(s) 110 may include any suitable computing device including, but not limited to, a server system, a mobile device such as a smartphone, a tablet, an e-reader, a wearable device, or the like; a desktop computer; a laptop computer; a content streaming device; a cloud computing device, a set-top box; or the like.

The vehicle location control server(s) 110 may be configured to communicate via one or more networks with one or more customer profile servers 114, user devices 106, or the like. The vehicle location control server(s) 110 may be configured to determine the location of each of a fleet of rental vehicles 102*a-n*, determine a new location for one or more of the fleet of rental vehicles 102*a-n*, and provide instructions for where the vehicle 102 should be moved based on a number of factors, including but not limited to, historical demand, anticipated demand, a special activity (e.g., concert, sporting event, business convention) occurring in a particular area at a particular time, or the like. The vehicle location control server(s) 110 may also determine the timing and location of prospective renters opening an application or accessing a website on a user device 106*a-n* to determine potential demand for rental vehicles in a particular area. The rental vehicle 102*a-n* may then be moved based on the instructions received from the vehicle location control server(s) 100 in an autonomous, semi-autonomous, or conventional manner.

The vehicle location control server(s) 110 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the vehicle location control server(s) 110 may include one or more processors (processor(s)) 134, one or more memory devices 132 (generically referred to herein as memory 132), one or more input/output (I/O) interfaces 136, one or more network interfaces 138, one or more sensors or sensor interfaces 152, and one or more transceivers 150. The vehicle location control server(s) 110 may further include one or more buses that functionally couple various components of the vehicle location control server(s) 110. The vehicle location control server(s) 110 may further include one or more antenna(e) that may include, without limitation, a cellular antenna for transmitting or receiving signals to/from a cellular network infrastructure, an antenna for transmitting or receiving Wi-Fi signals to/from an access point (AP) 112, a GPS Communication system 140 for receiving Global Navigation Satellite System (GNSS) signals from a GNSS satellite or Globalnaya Navigazionnaya Sputnikovaya Sistema (GLONASS) signals from a GLONASS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) may include at least one of a system bus, a memory bus, an address bus, or a message bus, and may permit exchange of information (e.g., data (including computer-executable code), signaling, etc.) between various components of the vehicle location control server(s) 110. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 132 of the vehicle location control server(s) 110 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 132 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 132 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 132 may include removable storage and/or non-removable storage including, but not limited to, magnetic storage, optical disk storage, and/or tape storage. The memory 132 may provide non-volatile storage of computer-executable instructions and other data. The memory 132, removable and/or non-removable, are examples of computer-readable storage media (CRSM) as that term is used herein.

The memory 132 may store computer-executable code, instructions, or the like that may be loadable into the memory 132 and executable by the processor(s) 134 to cause the processor(s) 134 to perform or initiate various operations. Moreover, output data generated as a result of execution of the computer-executable instructions by the processor(s) 134 may be stored in the memory 132.

More specifically, the memory 132 may store one or more operating systems (O/S) 142; one or more database management systems (DBMS) 146; and one or more program module(s), applications, engines, computer-executable code, scripts, or the like such as, for example, one or more data management module(s) 144, one or more mapping/routing module(s) 148, and/or one or more scheduling module(s) 142. Some or all of these module(s) may be sub-module(s). Any of the components depicted as being stored in the memory 132 may include any combination of software, firmware, and/or hardware. The software and/or firmware may include computer-executable code, instructions, or the like that may be loaded into the memory 132 for execution by one or more of the processor(s) 134. Any of the components depicted as being stored in the memory 132 may support functionality described in reference to corresponding components named earlier in this disclosure.

The memory 132 may further store various types of data utilized by components of the vehicle location control server(s) 110. Any data stored in the memory 132 may be loaded for use by the processor(s) 134 in executing computer-executable code. In addition, any data depicted as being stored in the memory 132 may potentially be stored in one or more datastore(s) and may be accessed via the DBMS 146 and loaded in the memory 132 for use by the processor(s) 134 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 134 may be configured to access the memory 132 and execute computer-executable instructions loaded therein. For example, the processor(s) 134 may be configured to execute computer-executable instructions of the various program module(s), applications, engines, or the like of the vehicle location control server(s) 110 to cause or facilitate various operations to be performed in accordance with one or more embodiments of the disclosure. The processor(s) 134 may include any suitable processing unit capable of accepting data as input, processing the input data in accordance with stored computer-executable instructions, and generating output data. The processor(s) 134 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 134 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 134 may be capable of supporting any of a variety of instruction sets.

Referring now to functionality supported by the various program module(s) depicted in FIG. 1, the data management module(s) 144 may include computer-executable instructions, code, or the like that responsive to execution by one or more of the processor(s) 134 may perform functions including, but not limited to, receiving location and status data from one or more rental vehicles 102a-n and transmitting the data to, for example, the routing module 148 and/or the scheduling module 142. In addition, the data management module(s) 144 may include computer-executable instructions, code, or the like that responsive to execution by one or more of the processor(s) 134 may perform functions including, but not limited to, receiving access notifications, and/or one or more rental requests from one or more user devices 106a-n, obtaining location, time, and rental vehicle option data from the requests, and transmitting the data to, for example, the scheduling module 142 and/or the routing module 148. The data management module 144 may receive the identification and location data of one or more rental vehicles 102a-n that satisfy the received rental request and may send the received data to the one or more user devices 106a-n. Additionally, the data management module 144 may receive location change data for one or more of the rental vehicles 102a-n from the scheduling module 142 and/or routing module 148, which may then be communicated to one or more of the rental vehicles 102a-n.

The routing module(s) 148 may include computer-executable instructions, code, or the like that responsive to execution by one or more of the processor(s) 134 may perform functions including, but not limited to, receiving information from the data management module 144. The routing module 148 may identify rental vehicles 102a-n within a predetermined range of a user device 106a-n making a rental request. Further, the routing module 148 made determine areas that one or more rental vehicles 102a-n need to be moved to and can provide the location to move each of the one or more rental vehicles 102a-n to the data management module 144.

The scheduling module(s) 142 may include computer-executable instructions, code, or the like that responsive to execution by one or more of the processor(s) 134 may perform functions including, but not limited to, receiving an indication from the data management module 144 for a user device 106a-n to see rentable vehicles near the user device 106a-n, rent a vehicle 102a-n, or the like. In addition, the scheduling module 142 may receive rental status information for each rental vehicle 102a-n in the rental vehicle fleet. Further, the scheduling module 142 may include time and date information that identify special events (e.g., concerts, sporting events, business conventions, etc.) or particular date and time periods during which increased demand for rental vehicles 102a-n is likely and can access this information to assist in determining where to relocate one or more rental vehicles 102a-n.

Referring now to other illustrative components depicted as being stored in the memory 132, the O/S 142 may be loaded from the memory 132 and may provide an interface between other application software executing on the vehicle location control server(s) 110 and the hardware resources of the vehicle location control server(s) 110. More specifically, the O/S 142 may include a set of computer-executable instructions for managing hardware resources of the vehicle location control server(s) 110 and for providing common services to other application programs (e.g., managing memory allocation among various application programs). In certain example embodiments, the O/S 142 may control execution of the other program module(s) to dynamically enhance characters for content rendering. The O/S 142 may include any operating system now known or which may be developed in the future including, but not limited to, any server operating system, any mainframe operating system, or any other proprietary or non-proprietary operating system.

The DBMS 146 may be loaded into the memory 132 and may support functionality for accessing, retrieving, storing, and/or manipulating data stored in the memory 132. The DBMS 146 may use any of a variety of database models (e.g., relational model, object model, etc.) and may support any of a variety of query languages. The DBMS 146 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the vehicle location control server(s) 110 is a mobile device, the DBMS 146 may be any suitable lightweight DBMS optimized for performance on a mobile device.

Referring now to other illustrative components of the vehicle location control server(s) 110, the input/output (I/O) interface(s) 136 may facilitate the receipt of input information by the vehicle location control server(s) 110 from one or more I/O devices as well as the output of information from the vehicle location control server(s) 110 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the vehicle location control server(s) 110 or may be separate. The I/O devices may further include, for example, any number of peripheral devices such as data storage devices, printing devices, and so forth.

The I/O interface(s) 136 may also include an interface for an external peripheral device connection such as universal serial bus (USB), FireWire, Thunderbolt, Ethernet port or other connection protocol that may connect to one or more networks. The I/O interface(s) 136 may also include a connection to one or more of the antenna(e) to connect to one or more networks via a wireless local area network (WLAN) (such as Wi-Fi) radio 112, Bluetooth, ZigBee, and/or a wireless network radio, such as a radio capable of communication with a wireless communication network such as a Long Term Evolution (LTE) network, WiMAX network, 3G network, etc.

The vehicle location control server(s) 110 may further include one or more network interface(s) 138 via which the vehicle location control server(s) 110 may communicate with any of a variety of other systems, platforms, networks, devices, and so forth. The network interface(s) 138 may enable communication, for example, with one or more wireless routers, one or more host servers, one or more web servers, and the like via one or more networks.

The antenna(e) of the vehicle location control server(s) 110 may include any suitable type of antenna depending, for example, on the communications protocols used to transmit or receive signals via the antenna(e). Non-limiting examples of suitable antennae may include directional antennae, non-directional antennae, dipole antennae, folded dipole antennae, patch antennae, multiple-input multiple-output (MIMO) antennae, or the like. The antenna(e) may be communicatively coupled to one or more transceivers 150 or radio components to which or from which signals may be transmitted or received.

As previously described, the antenna(e) may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) may be configured to transmit or receive radio frequency signals within any suitable frequency range forming part of the unlicensed portion of the radio spectrum.

The antenna(e) may additionally, or alternatively, include a GNSS antenna configured to receive GNSS signals from three or more GNSS satellites 108 carrying time-position information to triangulate a position therefrom. Such a GNSS antenna may be configured to receive GNSS signals from any current or planned GNSS 108 such as, for example, the Global Positioning System (GPS), the GLONASS System, the Compass Navigation System, the Galileo System, or the Indian Regional Navigational System.

The transceiver(s) 150 may include any suitable radio component(s) for—in cooperation with the antenna(e)—transmitting or receiving radio frequency (RF) signals in the bandwidth and/or channels corresponding to the communications protocols utilized by the vehicle location control server(s) 110 to communicate with other devices. The transceiver(s) 150 may include hardware, software, and/or firmware for modulating, transmitting, or receiving—potentially in cooperation with any of antenna(e)—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 150 may further include hardware, firmware, or software for receiving GNSS signals. The transceiver(s) 150 may include any known receiver and baseband suitable for communicating via the communications protocols utilized by the vehicle location control server(s) 110. The transceiver(s) 150 may further include a low noise amplifier (LNA), additional signal amplifiers, an analog-to-digital (A/D) converter, one or more buffers, a digital baseband, or the like.

The sensor(s)/sensor interface(s) 152 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 1 as being stored in memory 132 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the vehicle location control server(s) 110, and/or hosted on other computing device(s) accessible via one or more networks, may be provided to support functionality provided by the program module(s), applications, or computer-executable code depicted in FIG. 1 and/or additional or alternate functionality. Further, functionality may be modularized differently such that processing described as being supported collectively by the collection of program module(s) depicted in FIG. 1 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 1 may be implemented, at least partially, in hardware and/or firmware across any number of devices.

It should further be appreciated that the vehicle location control server(s) 110 may include alternate and/or additional hardware, software, or firmware components beyond those described or depicted without departing from the scope of the disclosure. More particularly, it should be appreciated that software, firmware, or hardware components depicted as forming part of the vehicle location control server(s) 110 are merely illustrative and that some components may not be present or additional components may be provided in various embodiments. While various illustrative program module(s) have been depicted and described as software module(s) stored in the memory 132, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

The example system 100 can also include one or more rental vehicles 102a-n that can be part of a rental vehicle fleet. Each rental vehicle 102a-n can be communicably coupled to and can communicate directly or indirectly with the vehicle location control server(s) 110. In some embodiments, all or at least a portion of the rental vehicles 102a-n include autonomous driving capabilities and can be driven along streets, roads, highways, etc. by a vehicle computer(s) 104 without a human driver. In some examples, each rental vehicle 102a-n can be adjusted (either locally or remotely) from an autonomous mode, where the vehicle is driven by the vehicle computer 104, to a non-autonomous mode, where the rental vehicle 102a-n is driven by a human being. The rental vehicle 102a-n can be any type of vehicle, including a car, truck, van, or motorcycle that is gas-powered, diesel-powered, hydrogen-powered, or electric and authorized to be driven on roadways. In alternate embodiments, rental vehicle 102a-n can include any machine intended to transport people or objects from one place to another without the need for a human pilot, including piloted vehicles that have been retrofitted with hardware, software, and/or firmware to allow the vehicle to be autonomously operated.

Each rental vehicle 102a-n can include one or more vehicle computer(s) 104. Each vehicle computer 104 can be communicably coupled to and can communicate directly or indirectly with the vehicle location control server(s) 110. In one example, each vehicle computer 104 can communicate with the vehicle location control server(s) 110 via one or more satellite systems 108. In other examples each vehicle computer 104 can communicate with the vehicle location control server(s) 110 via one or more of a cellular network, wireless local area network (WLAN) (such as Wi-Fi) radio 112, Bluetooth, ZigBee, and/or a wireless network radio, such as a radio capable of communication with a wireless communication network such as a Long Term Evolution (LTE) network, WiMAX network, 3G network, etc.

The vehicle computer(s) 104 may include any suitable computing device including, but not limited to, a server system, a mobile device such as a smartphone, a tablet, an e-reader, a wearable device, or the like; a desktop computer; a laptop computer; a content streaming device; a cloud computing device, a set-top box; or the like.

The vehicle computer(s) 104 may be configured to communicate via one or more networks with the vehicle location control server(s) 110, user devices 106a-n, or the like. The vehicle computer(s) 104 may be configured to provide real-time location and status data for the rental vehicle 102a-n to the vehicle location control server(s) 110, to receive location change data from the vehicle location control server(s) 110, receive real-time location data from a GPS satellite 118 or other positioning system, and to autonomously control the rental vehicle 102a-n to move the vehicle 102a-n from a first location to a second location based on the received location change data.

The vehicle computer(s) 104 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the vehicle computer(s) 104 may include one or more processors (processor(s)) 116, one or more memory devices 118 (generically referred to herein as memory 118), one or more input/output (I/O) interfaces 120, one or more network interfaces 122, one or more sensors or sensor interfaces 119, one or global positioning systems 121, one or more autonomous vehicle control systems 123, and one or more transceivers 125. The vehicle computer(s) 104 may further include one or more buses that functionally couple various components of the vehicle computer(s) 104. The vehicle computer(s) 104 and/or the rental vehicle 102a-n itself may further include one or more antenna(e) that may include, without limitation, a cellular antenna for transmitting or receiving signals to/from a cellular network infrastructure, an antenna for transmitting or receiving Wi-Fi signals to/from an access point (AP) 112, a global positioning system (GPS) 121 for transmitting and receiving Global Navigation Satellite System (GNSS) signals from a GNSS satellite 108 or Globalnaya Navigazionnaya Sputnikovaya Sistema (GLONASS) signals from a GLONASS satellite 108, a Bluetooth antenna for transmitting or receiving Bluetooth signals, a Near Field Communication (NFC) antenna for transmitting or receiving NFC signals, and so forth. These various components will be described in more detail hereinafter.

The bus(es) may include at least one of a system bus, a memory bus, an address bus, or a message bus, and may permit exchange of information (e.g., data (including computer-executable code), signaling, etc.) between various components of the vehicle computer(s) 104. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 118 of the vehicle computer(s) 104 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory.

In various implementations, the memory 118 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 118 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 118 may include removable storage and/or non-removable storage including, but not limited to, magnetic storage, optical disk storage, and/or tape storage. The memory 118 may provide non-volatile storage of computer-executable instructions and other data. The memory 118, removable and/or non-removable, are examples of computer-readable storage media (CRSM) as that term is used herein.

The memory 118 may store computer-executable code, instructions, or the like that may be loadable into the memory 118 and executable by the processor(s) 116 to cause the processor(s) 116 to perform or initiate various operations. Moreover, output data generated as a result of execution of the computer-executable instructions by the processor(s) 116 may be stored in the memory 118.

More specifically, the memory 118 may store one or more operating systems (O/S) 126; one or more database management systems (DBMS) 129; and one or more program module(s), applications, engines, computer-executable code, scripts, or the like such as, for example, one or more data management module(s) 128, and one or more mapping/routing module(s) 127. Some or all of these module(s) may be sub-module(s). Any of the components depicted as being stored in the memory 118 may include any combination of software, firmware, and/or hardware. The software and/or firmware may include computer-executable code, instructions, or the like that may be loaded into the memory 118 for execution by one or more of the processor(s) 116. Any of the components depicted as being stored in the memory 118 may support functionality described in reference to corresponding components named earlier in this disclosure.

The memory 118 may further store various types of data utilized by components of the vehicle computer(s) 104. Any data stored in the memory 118 may be loaded for use by the processor(s) 116 in executing computer-executable code. In addition, any data depicted as being stored in the memory 118 may potentially be stored in one or more datastore(s) and may be accessed via the DBMS 146 and loaded in the memory 118 for use by the processor(s) 116 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 116 may be configured to access the memory 118 and execute computer-executable instructions loaded therein. For example, the processor(s) 116 may be configured to execute computer-executable instructions of the various program module(s), applications, engines, or the like of the vehicle computer(s) 104 to cause or facilitate various operations to be performed in accordance with one or more embodiments of the disclosure. The processor(s) 116 may include any suitable processing unit capable of accepting data as input, processing the input data in accordance with stored computer-executable instructions, and generating output data. The processor(s) 116 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 116 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 116 may be capable of supporting any of a variety of instruction sets.

Referring now to functionality supported by the various program module(s) of the vehicle computer(s) 104 depicted in FIG. 1, the data management module(s) 128 may include computer-executable instructions, code, or the like that responsive to execution by one or more of the processor(s) 116 may perform functions including, but not limited to, receiving location data from the GPS system 121 and transmitting the data to, for example, the routing module 127. In addition, the data management module(s) 128 may include computer-executable instructions, code, or the like that responsive to execution by one or more of the processor(s) 116 may perform functions including, but not limited to, receiving instructions from the vehicle location control server(s) 110 to move the particular rental vehicle 102a-n from its current location to a second location and transmitting the data to, for example, the vehicle control module 123 and/or the routing/mapping module 127 to autonomously and automatically move the rental vehicle 102a-n from its current location to the second location. The data management module 128 may also receive rental request information from the user device 106*a-n* and/or the vehicle location control server(s) 110 regarding renting the particular rental vehicle 102*a-n* and may send the received data to the rental status module 124 which stores data regarding the rental status and rental history of the particular rental vehicle 102*a-n*.

The routing module(s) 127 may include computer-executable instructions, code, or the like that responsive to execution by one or more of the processor(s) 116 may perform functions including, but not limited to, receiving location change information for the rental vehicle 102*a-n* from the data management module 128. The routing module 127 may determine one or more routes for moving the rental vehicle 102*a-n* from its current location to the second location. Further, the routing module 127 may determine areas where the rental vehicle 102*a-n* may be parked at or near the second location.

Referring now to other illustrative components depicted as being stored in the memory 118, the O/S 126 may be loaded from the memory 118 and may provide an interface between other application software executing on the vehicle computer(s) 104 and the hardware resources of the vehicle computer(s) 104. More specifically, the O/S 126 may include a set of computer-executable instructions for managing hardware resources of the vehicle computer(s) 104 and for providing common services to other application programs (e.g., managing memory allocation among various application programs). In certain example embodiments, the O/S 126 may control execution of the other program module(s) to dynamically enhance characters for content rendering. The O/S 126 may include any operating system now known or which may be developed in the future including, but not limited to, any server operating system, any mainframe operating system, or any other proprietary or non-proprietary operating system.

The DBMS 129 may be loaded into the memory 118 and may support functionality for accessing, retrieving, storing, and/or manipulating data stored in the memory 118. The DBMS 129 may use any of a variety of database models (e.g., relational model, object model, etc.) and may support any of a variety of query languages. The DBMS 129 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the vehicle computer(s) 104 is a mobile device, the DBMS 129 may be any suitable lightweight DBMS optimized for performance on a mobile device.

Referring now to other illustrative components of the vehicle computer(s) 104, the input/output (I/O) interface(s) 120 may facilitate the receipt of input information by the vehicle computer(s) 104 from one or more I/O devices as well as the output of information from the vehicle computer(s) 104 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the vehicle computer(s) 104 or may be separate. The I/O devices may further include, for example, any number of peripheral devices such as mice, touch pads, data storage devices, printing devices, and so forth.

The I/O interface(s) 120 may also include an interface for an external peripheral device connection such as universal serial bus (USB), FireWire, Thunderbolt, Ethernet port or other connection protocol that may connect to one or more networks. The I/O interface(s) 120 may also include a connection to one or more of the antenna(e) to connect to one or more networks via a wireless local area network (WLAN) (such as Wi-Fi) radio 112, Bluetooth, ZigBee, and/or a wireless network radio, such as a radio capable of communication with a wireless communication network such as a Long Term Evolution (LTE) network, WiMAX network, 3G network, etc.

The vehicle computer(s) 104 may further include one or more network interface(s) 122 via which the vehicle computer(s) 104 may communicate with any of a variety of other systems, platforms, networks, devices, and so forth. The network interface(s) 122 may enable communication, for example, with one or more wireless routers, one or more host servers, one or more web servers, and the like via one or more networks.

The antenna(e) of the vehicle computer(s) 104 and/or the rental vehicle 102*a-n* may include any suitable type of antenna depending, for example, on the communications protocols used to transmit or receive signals via the antenna (e). Non-limiting examples of suitable antennae may include directional antennae, non-directional antennae, dipole antennae, folded dipole antennae, patch antennae, multiple-input multiple-output (MIMO) antennae, or the like. The antenna (e) may be communicatively coupled to one or more transceivers 125 or radio components to which or from which signals may be transmitted or received.

As previously described, the antenna(e) may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) may be configured to transmit or receive radio frequency signals within any suitable frequency range forming part of the unlicensed portion of the radio spectrum.

The antenna(e) may additionally, or alternatively, include a GNSS antenna configured to receive GNSS signals from three or more GNSS satellites 108 carrying time-position information to triangulate a position therefrom. Such a GNSS antenna may be configured to receive GNSS signals from any current or planned GNSS 108 such as, for example, the Global Positioning System (GPS), the GLONASS System, the Compass Navigation System, the Galileo System, or the Indian Regional Navigational System.

The transceiver(s) 125 may include any suitable radio component(s) for—in cooperation with the antenna(e)—transmitting or receiving radio frequency (RF) signals in the bandwidth and/or channels corresponding to the communications protocols utilized by the vehicle computer(s) 104 to communicate with other devices. The transceiver(s) 125 may include hardware, software, and/or firmware for modulating, transmitting, or receiving—potentially in cooperation with any of antenna(e)—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 125 may further include hardware, firmware, or software for receiving GNSS signals. The transceiver(s) 125 may include any known receiver and baseband suitable for communicating via the communications protocols utilized by the vehicle computer(s) 104.

The sensor(s)/sensor interface(s) 119 may include or may be capable of interfacing with any suitable type of sensing device such as, for example, inertial sensors, velocity sensors, cameras, proximity sensors, force sensors, thermal sensors, and so forth to assist with, for example, the positioning/location of the rental vehicle 102*a*-*n* and autonomous or semi-autonomous driving of the rental vehicle 102*a*-*n*. Example types of inertial sensors may include accelerometers, gyroscopes, and so forth.

It should be appreciated that the program module(s), applications, computer-executable instructions, code, or the like depicted in the vehicle computer(s) 104 of FIG. 1 as being stored in memory 118 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the vehicle computer(s) 104, and/or hosted on other computing device(s) accessible via one or more networks, may be provided to support functionality provided by the program module(s), applications, or computer-executable code depicted in the vehicle computer(s) 104 of FIG. 1 and/or additional or alternate functionality. Further, functionality may be modularized differently such that processing described as being supported collectively by the collection of program module(s) depicted in the vehicle computer(s) 104 of FIG. 1 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in the vehicle computer(s) 104 of FIG. 1 may be implemented, at least partially, in hardware and/or firmware across any number of devices.

It should further be appreciated that the vehicle computer(s) 104 may include alternate and/or additional hardware, software, or firmware components beyond those described or depicted without departing from the scope of the disclosure. More particularly, it should be appreciated that software, firmware, or hardware components depicted as forming part of the vehicle computer(s) 104 are merely illustrative and that some components may not be present or additional components may be provided in various embodiments. While various illustrative program module(s) have been depicted and described as software module(s) stored in the memory 118, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

The example system 100 may further include one or more user devices 106*a*-*n*. In certain embodiments, the user devices 106*a*-*n* can be one or more of a smartphone, smartwatch, tablet, laptop computer, or other mobile computing device. Each user device can be configured to be communicably coupled to the vehicle location control server(s) 110 and/or the vehicle computer 104 via one or more of satellite communication 108 and other antenna-based communications 112.

Each user device 106*a*-*n* may have a web browser or a dedicated mobile application (e.g., a vehicle rental application) for requesting a rental vehicle 102*a*-*n* to rent. In certain embodiments, the website and/or dedicated mobile application can include one or more input areas to receive user input of data associated with a vehicle rental request. The input data can include, but is not limited to, the user name, user location, time period that a vehicle rental is desired (e.g., start rental time/end rental time), current location (e.g., street address, city, state, zip code), search range (e.g., the distance the user may be willing to walk or be transported to a rental vehicle 102*a*-*n*), rental vehicle options (e.g., vehicle class, vehicle size, vehicle make, vehicle model, vehicle power type (e.g., electric, gas-powered, hydrogen-powered), number of passengers, vehicle color, etc.). Each user device 106*a*-*n* can also include a GPS system for providing real-time location information for the user device 106*a*-*n*. Each user device 106*a*-*n* can also include a touchscreen, touchpad, mouse, keyboard, microphone and/or other input device for receiving input data from the user of the user device 106*a*-*n*.

Each user device 106*a*-*n* can also include one or more antennae. The antennae may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) may be configured to transmit or receive radio frequency signals within any suitable frequency range forming part of the unlicensed portion of the radio spectrum.

The antenna(e) may additionally, or alternatively, include a GNSS antenna configured to receive GNSS signals from three or more GNSS satellites 108 carrying time-position information to triangulate a position therefrom. Such a GNSS antenna may be configured to receive GNSS signals from any current or planned GNSS 108 such as, for example, the Global Positioning System (GPS), the GLONASS System, the Compass Navigation System, the Galileo System, or the Indian Regional Navigational System.

Illustrative Processes and Use Cases

Figure 2:
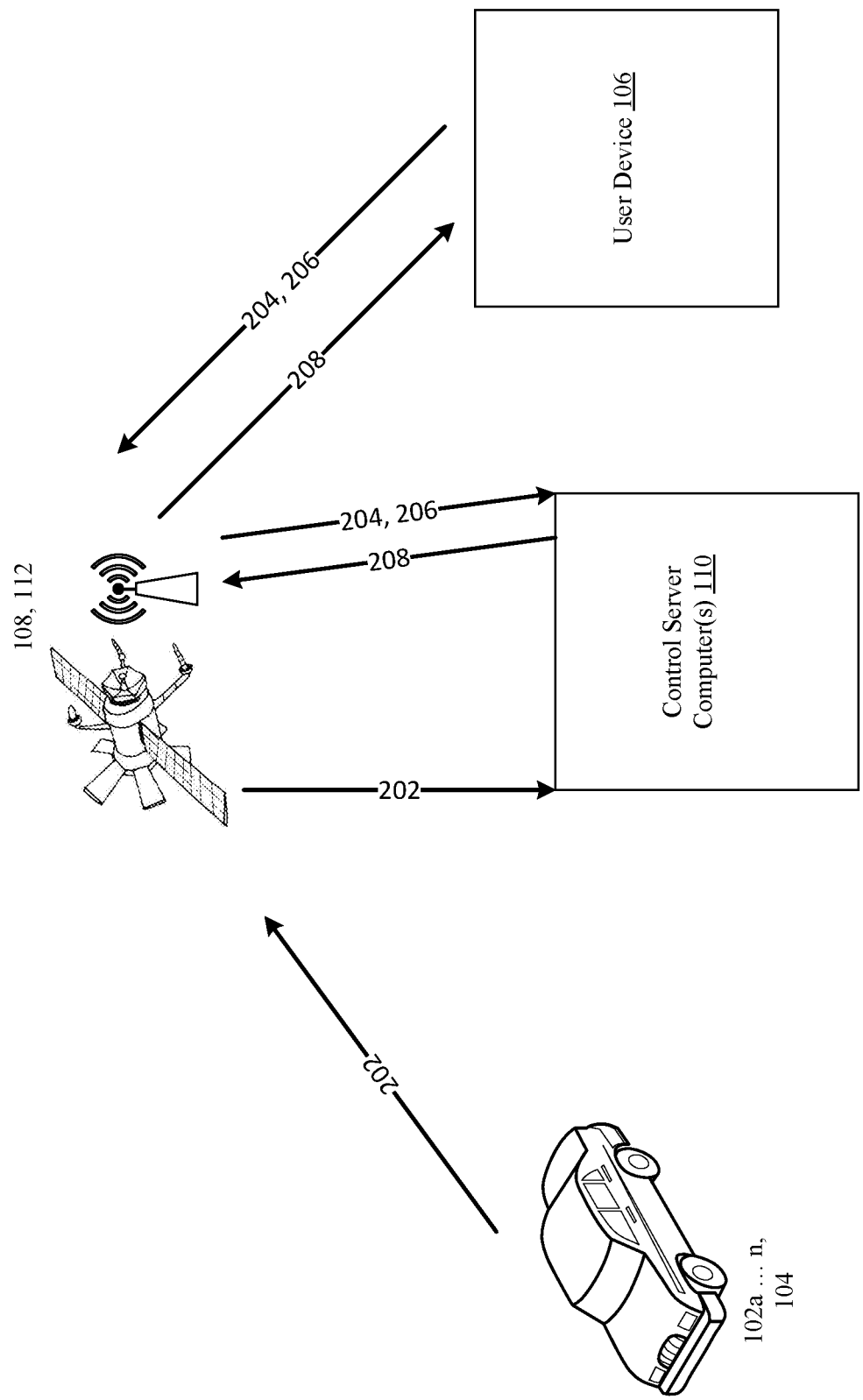
FIG. 2 is an example schematic hybrid system/data flow diagram depicting various illustrative data communications between components of the system architecture depicted in FIG. 1 as part of the processes for determining and adjusting vehicle location in accordance with one or more embodiments of the disclosure.
Figure 3:
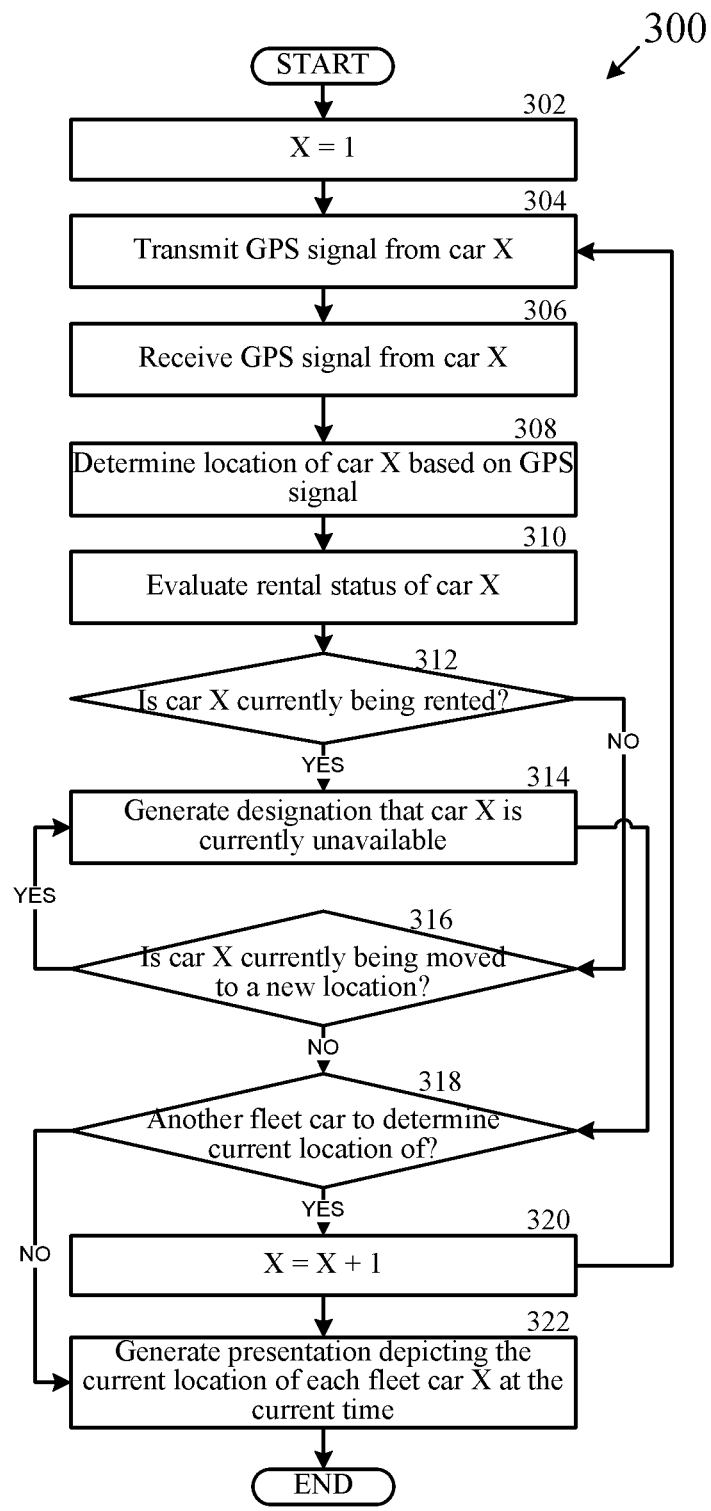
FIG. 3 is an example process flow diagram for determining the location of each of a fleet of rental vehicles in accordance with one or more embodiments of the disclosure.

FIG. 2 is an example schematic hybrid system/data flow diagram depicting various illustrative data communications between components of the system architecture depicted in FIG. 1 as part of the processes for determining and adjusting vehicle location in accordance with one or more embodiments of the disclosure. FIG. 3 is an example process flow diagram 300 for identifying the location and availability status of each rental vehicle 102*a-n* in the rental vehicle fleet in accordance with one or more embodiments of the disclosure. Although this example embodiment is described with reference to rental vehicles, the invention is also applicable to non-rental applications (e.g., a fleet of vehicles provided for use by employees, students, guests, etc. without charge). Referring now to FIGS. 1-3 the example process 300 can begin at the START block and proceed to block 302, where a counter variable X is set equal to one. Each value of the counter variable X represents one of the rental vehicles 102*a-n* in the rental vehicle fleet, where the max value of X is equal to the total number of vehicles in the fleet.

At block 304, location information 202 (e.g., position coordinates) is transmitted from the first rental vehicle 102*a* in the rental vehicle fleet 102*a-n*. In certain embodiments, the location information is generated by the GPS system 121 of the vehicle computer(s) 104 of the rental vehicle 102*a*, based on signals received from the GPS satellite 108 that are used to determine the current real-time location of the rental vehicle 102*a*. The determination of the real-time location of the rental vehicle 102*a* can be a continuously or near-continuously updating process and should not be read as a one-time occurrence in the example process 300. The location information 202 (e.g., GPS signals and/or the determined location of the rental vehicle 102*a* 202) can be electronically transmitted to the vehicle location control server(s) 110. In certain examples, the location information 202 of the rental vehicle 102*a* can be transmitted to the vehicle location control server(s) 110 via satellite 108, cellular, radio, Wi-Fi, or another communication protocol known to those of ordinary skill in the art.

At block 306, the vehicle location control server(s) 110 can receive the GPS signal or location information 202 for the first rental vehicle 102*a*. In certain examples, the GPS signal or location information 202 can be received by the GPS communications module 140 via the antenna and transceiver 150 and electronically transmitted to the routing/mapping module 148. At block 308, the vehicle location control server(s) 110 can determine the location of the first rental vehicle 102*a* based on the GPS signal and/or the location information 202 for the first rental vehicle 102*a*. For example, the determination of the location of the first rental vehicle 102*a* can be handled by the routing/mapping module 148.

The routing/mapping module 148 can compare the location information 202 to mapping information to determine the real-time location of the first rental vehicle 102*a*. The routing/mapping module 148 can generate a display of a map and can position a indicator on the map representing the current location of the first rental vehicle 102*a*. The current location of the first rental vehicle 102*a* can be continuously updated based on additional, updated, real-time, GPS data and/or location information 202 received from the first vehicle 102*a* and continuously updated by the routing/mapping module 148. Alternatively, the updated GPS data and/or location information 202 for the first rental vehicle 102*a* can be acquired at predetermined time intervals. The predetermined time interval can be anywhere in the range of 1 second to 1 hour.

At block 310, the vehicle location control server(s) 110 can evaluate the rental status of the first rental vehicle 102*a*. For example, the vehicle location control server(s) 110 can determine if the first rental vehicle 102*a* is currently being rented and is therefore unavailable, is currently available for rental, is currently being repositioned (e.g., autonomously) to a new location in response to instructions from the server(s) 110 and is therefore unavailable, or is unavailable for another reason. In certain embodiments, the processor 134 can employ the data management module 144 to evaluate status information received from the rental vehicle 102*a* and/or access vehicle status data in the scheduling module 142 to determine the current status of the rental vehicle 102*a*.

At block 312, an inquiry is conducted based on the information evaluated at block 310 to determine if the rental vehicle 102*a* is currently being rented. In certain embodiments, the determination can be made by the vehicle location control server(s) 110 based on the status data transmitted by the rental vehicle 102*a* and/or status information in the scheduling module 142. For example, the data management module 144 can evaluate the status data received from the rental vehicle 102*a* to determine if the rental vehicle 102*a* is currently being rented. If the rental vehicle is not currently being rented, the NO branch can be followed to block 316. If the rental vehicle is currently being rented, the YES branch can be followed to block 314, where the data management module 144 can verify that the current status for the rental vehicle 102*a* is designated as rented in the scheduling module 142 or update the status indicator in the scheduling module 142 to designate that the rental vehicle 102*a* is currently being rented.

At block 316, an inquiry is conducted based on the information evaluated at block 310 to determine if the rental vehicle 102*a* is not currently being rented but is currently unavailable because it is autonomously moving to a new location or is unavailable for another reason (e.g., cleaning, maintenance, fueling, etc.). In certain embodiments, the determination can be made by the vehicle location control server(s) 110 based on the status data transmitted by the rental vehicle 102*a* and/or status information in the scheduling module 142. For example, the data management module 144 can evaluate the status data received from the rental vehicle 102*a* to determine if the rental vehicle 102*a* is currently unavailable because it is autonomously moving to a new location or is unavailable for another reason. If the rental vehicle is not currently unavailable because it is autonomously moving to a new location or unavailable for another reason, the NO branch can be followed to block 318. If the rental vehicle is currently unavailable because it is autonomously moving to a new location or is unavailable for another reason, the YES branch can be followed to block 314, where the data management module 144 can verify that the current status for the rental vehicle 102*a* is designated as currently unavailable because it is autonomously moving to a new location. Alternatively, the data management module 144 can determine that rental vehicle 102*a* is unavailable for another reason in the scheduling module 142. Data management module 144 can then update the status indicator in the scheduling module 142 to designate that the rental vehicle 102*a* is currently unavailable because it is autonomously moving to a new location or is unavailable for another reason. Alternatively, the autonomous move can be canceled, and rental vehicle 102*a* can be designated available.

At block 318, an inquiry is conducted to determine if there is another rental vehicle 102*a-n* to evaluate for current location and status. In certain examples, the determination can be made by the processor 134 employing the data management module 144 to determine if the current location and status of all of the rental vehicles 102*a-n* has been determined within a predetermined amount of time. In certain example embodiments, the evaluation of location and status of each of the rental vehicles 102*a-n* is continuous or substantially continuous. In other example embodiments, the predetermined amount of time to update the location and status of each rental vehicle 102*a-n* is within the range of less than 1 second to 1 hour. If there is another rental vehicle 102*a-n* in the vehicle fleet to evaluate, then the YES branch is followed to block 320, where the counter variable is incremented (e.g., by the processor(s) 134) by one and the process returns to block 304 to begin an evaluation of the next rental vehicle 102*a-n*.

If there are no additional rental vehicles 102*a-n* to evaluate in this iteration or at this time, the NO branch is followed to block 322. At block 322, a graphical presentation depicting the current location of each rental vehicle X 102*a-n* and optionally the status of each rental vehicle X is generated on a map, such as a street-level map of a predetermined area. An example of the generated graphical presentation of rental vehicle location and status is provided in FIG. 6. This graphical representation is for example purposes only as many other ways of showing location and status (e.g., different shapes, different sizes, different colors, etc.) could be used and are considered part of this disclosure. Further, the size of the map and the area covered under the map are also for example purposes only, as a user of the vehicle location control server(s) 110 could be able to zoom in/out on the map and/or choose a specific area in the world to view in order to view all or a portion of a particular rental vehicle fleet. The process could then proceed to the END step. While an END step is shown in the process 300, the process is considered in some embodiments to be iterative and may not ever end, but rather would just restart from the beginning or at any portion of the process 300 described above.

Figure 4:
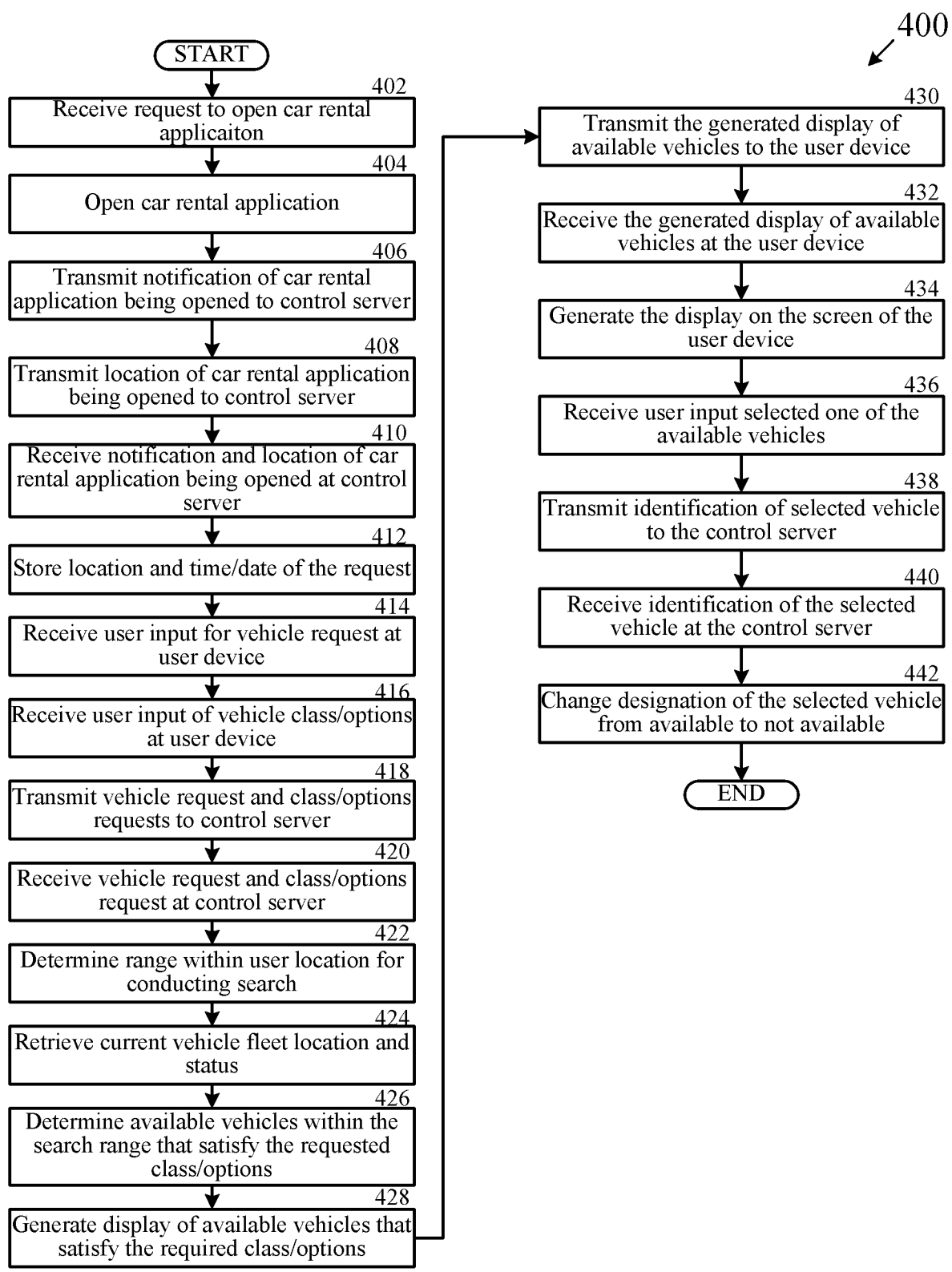
FIG. 4 is an example process flow diagram for identifying vehicles available for rental based on a request from a prospective renter in accordance with one or more embodiments of the disclosure.

FIG. 4 is an example process 400 for identifying rental vehicles 102*a-n* available for rental based on a request from a prospective renter in accordance with one or more embodiments of the disclosure. Now referring to FIGS. 1, 2, and 4, the example process 400 begins at the START step and proceeds to block 402, where the user device 106*a-n* receives a request to open the vehicle rental application, another application providing vehicle rental capabilities, and/or accesses a webpage via a web browser on the user device 106*a-n* that provides access the vehicle rental process. In one example, a human user of the user device 106*a-n* can touch select an application on the screen of the user device 106*a-n* to open that vehicle rental application or can input an uniform resource locator (URL) into the web browser on the user device to access a website that provides the vehicle rental capability. Alternatively, a user can select a hyperlink directing the user to the website or vehicle rental application.

At block 404, the vehicle rental application is opened on the user device 106*a-n* or the vehicle rental website is accessed on the user device 106*a-n*. In certain examples, at block 406, upon opening the vehicle rental application or another related application or upon accessing the vehicle rental website, a notification 204 can be transmitted from the user device 106*a-n* to the vehicle location control server(s) 110 via one or more of the satellites 108, Wi-Fi 112 or another communication protocol. In certain examples, the notification 204 can include an indication that a user is accessing the vehicle rental application or website and the time the user is accessing the vehicle rental application or website. In addition, as described at block 408, the notification 204 can also include the actual or estimated location of the user device 106*a-n* at the time the vehicle rental application was opened or the vehicle rental website was accessed. For example, GPS data from the GPS of the user device 106*a-n* can be included with the data in the notification 204. Alternatively, other location data can be provided via Internet access, Wi-Fi access and/or cellular access.

At block 410, the vehicle location control server(s) 110 can receive the open/access notification for the vehicle rental application or vehicle rental website, time data, and the location data. In certain embodiments, the open/access notification, time data, and location data can be received at the vehicle location control server(s) 110 by the data management module 144 via the transceiver 150 and can be distributed to one or more of the GPS communications module 140 (to determine location of the user device 106*a-n* at the time of opening/accessing the vehicle rental application or website) and the routing/mapping module 148 to map the location of the user device 106*a-n* based on the location data.

At block 412, the vehicle location control server(s) 110 can store the location data and the time/date data received from the user device 106*a-n*. In one example, the location data and the time/date data can be stored by the data management module 144 in the DBMS 146 for subsequent evaluation. The subsequent evaluation can include determining location clusters where a predetermined number of users accessed/opened the vehicle rental application or website over a predetermined amount of time. Such evaluation will help show areas where demand for vehicles may be higher than other areas. The demand or number of opens/accesses of the vehicle rental application or website can also be compared to the number of rental vehicles that are available for rental within a predetermined distance (e.g., less then 1 mile) of that area to determine if more rental vehicles 102*a-n* need to be moved within the predetermined distance of that area or need to be moved away from that area (e.g., due to low anticipated demand).

At block 414, user input is received at the user device 106*a-n* for requesting 206 a rental vehicle 102*a-n*. The user input can be based on one or more prompts provided at the vehicle rental application and/or website. At block 416, additional user input can be received a the user device 106*a-n*. The additional user input can include additional information that supplements the request 206 for the rental vehicle 102*a-n*. This supplemental information that can be part of the rental vehicle request 206 can include, but is not limited to, the user name, user location, time period that a vehicle rental is desired (e.g., start rental time/end rental time), current location (e.g., street address, city, state, zip code), search range (e.g., the distance the user may be willing to walk or be transported to a rental vehicle 102a-n), rental vehicle options (e.g., vehicle class, vehicle size, vehicle make, vehicle model, vehicle power type (e.g., electric, gas-powered, hydrogen-powered), number of passengers, vehicle color, etc.).

At block 418, the user device 106a-n and/or web browser on the user device 106a-n can electronically transmit the vehicle rental request 206 to the vehicle location control server(s) 110. For example, the vehicle rental request 206 can be transmitted from the user device 106a-n to the vehicle location control server(s) 110 via one or more satellite 108, Wi-Fi 112, cellular or other known communications protocols. At block 420, the rental vehicle request 206 can be received by the vehicle location control server(s) 110. For example, the rental vehicle request 206 can be received by the data management module 144 via the transceiver 150.

At block 422, the vehicle location control server(s) 110 can determine a range within the identified location of the user device 106a-n that sent the request to conduct a search for available rental vehicles 102a-n. In one example, the rental vehicle search range can be a preset value or a set of preset values (depending on certain factors such as day, time, location, events occurring at that time in a nearby area, etc.) stored in memory 132 and accessed by the data management module 144. In other examples, the rental vehicle search range can be one of the user input values received as part of the vehicle rental request 206.

At block 424, the vehicle location control server(s) 110 can retrieve the current location of each rental vehicle 102a-n in the rental vehicle fleet and the current status (e.g., available for rental, autonomously moving to a new location and unavailable, unavailable for another reason) for each rental vehicle 102a-n. In certain examples, the data management module 144 can access the current location of each rental vehicle 102a-n from the routing/mapping module 148 and the current status for each rental vehicle 102a-n from the scheduling module. One example for determining the current location and status of each rental vehicle 102a-n is set forth above with regard to FIG. 3 and its associated disclosure.

At block 426, the vehicle location control server(s) 110 can determine rental vehicles 102a-n that are available for rental, are within the rental vehicle search range, and match the rental vehicle options input by the user and provided as part of the rental vehicle request. For example, the data management module can conduct a matching algorithm on the rental vehicles within the rental vehicle search range to determine those rental vehicles 102a-n that match or satisfy the rental vehicle options provided in the rental vehicle request 206. At block 428, the vehicle location control server(s) 110 can generate a display of all rental vehicles 102a-n in the rental vehicle search range that match or otherwise satisfy the rental vehicle options provided by the user via the user device 106a-n in the rental vehicle request 206. The display can be a table or listing of available rental vehicles 102a-n and the current location (e.g., where they are parked). In addition, or alternatively, the generated display can be a map-based display that presents the location of each available rental vehicle 102a-n that matches the requirements in the rental vehicle request 206. In certain embodiments, the display of available rental vehicles 102a-n can be generated by the routing/mapping module 148 and accessed by the data management module 144.

At block 430, the generated display 208 of available rental vehicles 102a-n can be electronically transmitted from the vehicle location control server(s) 110 to the user device 106a-n that sent the rental vehicle request 206. For example, the generated display 208 of available rental vehicles 102a-n can be transmitted from the server(s) 110 by the transceiver 150 to the user device 106a-n via one or more satellite 108, Wi-Fi 112, cellular, or other known communications protocols. At block 432, the generated display 208 of available rental vehicles 102a-n can be received by the user device 106a-n and the display 208 can be generated for viewing on the user device 106a-n at block 434.

At block 436, the user device 106a-n receiving the generated display 208 can receive user input representing the selection of one of the available rental vehicles 102a-n for rental. For example, the user can touch the touch screen of the user device 106a-n at a location on the generated display 208 corresponding to one of the available rental vehicles 102a-n. At block 438, the user device 106a-n, can electronically transmit rental selection data 210 representing an identification of the rental vehicle 102a-n selected by the user for rental to the vehicle location control server(s) 110. For example, the rental selection data 210 can be transmitted from the user device 106a-n to the vehicle location control server(s) 110 via one or more satellite 108, Wi-Fi 112, cellular or other known communications protocols.

At block 440, the rental selection data 210 can be received by the vehicle location control server(s) 110. For example, the rental selection data 210 can be received by the data management module 144 via the transceiver 150. At block 442, the vehicle location control server(s) 110 can change the status designation for the selected rental vehicle 102a-n from available for rental to unavailable. In certain embodiments, the change in designation can be completed by the data management module 144 modifying the status designation for the selected vehicle in the scheduling module 142.

During the rental period, the user or renter of the selected rental vehicle 102a-n may drive the vehicle around to a number of different locations. As the rental period nears an end, a threshold timer at the vehicle location control server(s) 110 may indicate that the rental period is about to end. The vehicle location control server(s) 110 can determine the current location of the selected rental vehicle 102a-n. The vehicle location control server(s) 110 can also determine a desired location for the selected rental vehicle 102a-n to be left by the renter at the end of the rental period. In certain examples, the desired location can be determined based on expected demand and/or current rental vehicle capacity in a particular area, as discussed in greater detail with reference to FIGS. 5A-5B below. The vehicle location control server 110 can electronically transmit to the renter a request to leave the selected rental vehicle 102a-n at the desired location at the end of the rental period. The request can be transmitted to either or both of the user device 106a-n for the renter and/or the vehicle computer 104 for display on a display screen within the selected rental vehicle 102a-n. The request can include one or more incentives for the renter in order to try and convince the renter to leave the selected rental vehicle 102a-n at the desired location. These incentives can include, but are not limited to, coupons and discounts on this or future rentals. At the end of the rental period, the vehicle location control server(s) 110 can determine the location of the selected rental vehicle 102a-n. If the selected rental vehicle 102a-n is located at the desired location, then the vehicle location control server(s) 110 can electronically transmit the incentives (e.g., coupons, discounts, etc.) to the user device 106a-n of the renter. The process may then continue to the END block.

Figure 5B:
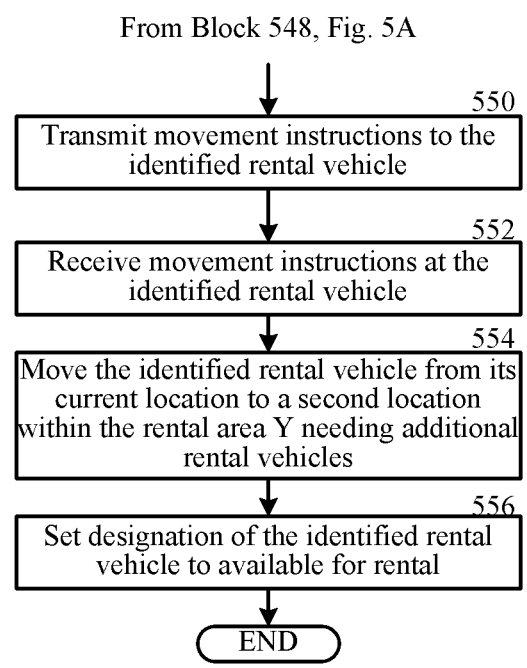

FIGS. 5A-5B are an example process 500 for adjusting rental vehicle location in accordance with one example embodiment of the disclosure. Referring to FIGS. 1-5B, the example process can begin at the START block and proceed to block 502, where the vehicle location control server(s) 110 can retrieve location data and time/date data for each vehicle rental application opening and webpage access of the vehicle rental application or website by a user device 106*a-n* for a predetermined period of time or a particular historical time period. In certain embodiments, the location data and the time/date data can be retrieved by the data management module 144 from the DBMS 146. In certain embodiments, the data retrieved can be all the data collected for a predetermined time period prior to the current time. For example, the predetermined time period can be any time range between 1 hour and 5 years and optionally could be any one of 1 day, 1 week, 2 weeks, 1 month, 2 months, 3 months, or 1 year. In other embodiments, the data retrieved can be a particular historical time period, such as the same date in the prior year or over multiple prior years, a seven day period in that includes the current month and day in the prior year or over multiple prior years, a corresponding holiday time period in the prior year or over multiple prior years, etc.

At block 504, the vehicle location control server(s) 110 can generate a map depicting the location of each user device 106*a-n* when it opened the vehicle rental application or accessed the vehicle rental webpage during the predetermined period of time or the historical time period as discussed above. In one example, the data management module 144 can employ the routing/mapping module 148 to generate the map based on the location data received in block 502.

Figure 6:
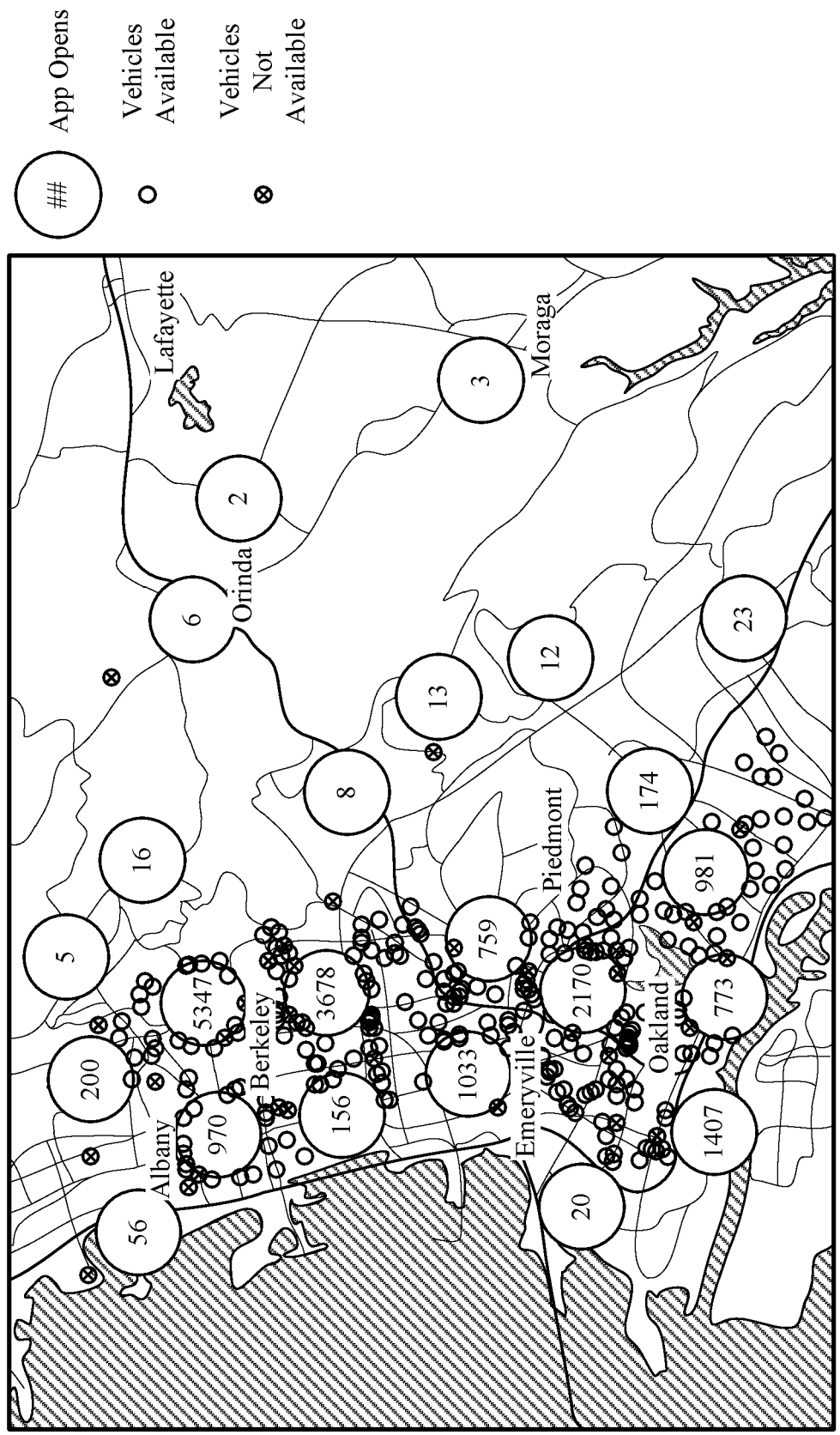
FIG. 6 is an example display presenting the location of available vehicles for rent and the location of a rental application being opened by a prospective renter in accordance with one example embodiment of the disclosure.

At block 506, the vehicle location control server(s) 110 can retrieve the current location and status for each rental vehicle 102*a-n* in the rental vehicle fleet. In certain examples, the data management module 144 can access the current location of each rental vehicle 102*a-n* from the routing/mapping module 148 and the current status for each rental vehicle 102*a-n* from the scheduling module. One example for determining the current location and status of each rental vehicle 102*a-n* is set forth above with regard to FIG. 3 and its associated disclosure. At block 508, the vehicle location control server(s) 110 can modify the map generated at block 504 to include (or overlay) designations representing the location of each rental vehicle 102*a-n* in the rental vehicle fleet. Optionally, the vehicle location control server(s) 110 can limit its modification (overlay) of the map to include designations representing the location of each rental vehicle 102*a-n* that is currently available for rental, as determined by the retrieved rental vehicle status. In certain embodiments, the data management module 144 employs the routing/mapping module 148 to modify the map to include the location of the rental vehicles 102*a-n*. An example of the map is presented in FIG. 6 as map 600. In the example of FIG. 6, the map 600 includes designations for rental vehicles 102*a-n* that are both currently available and currently unavailable for rental.

At block 510, the map modified at block 508 can be optionally divided into preselected rental areas (Y). In certain embodiments, the modified map can be divided in a grid format where each portion of the grid can represent the same or different amounts of square mileage for the modified map. In other embodiments, the modified map can be divided or split up based on other factors, such as population or type of land use (e.g., business, industrial, high occupancy residential, residential, etc.). At block 512, counter variable Y can be set to one. The counter variable Y can represent the number of rental areas that a map is divided into for analysis of expected demand for rental vehicles 102*a-n*.

At block 514, the vehicle location control server(s) 110 can determine the number of rental vehicle application openings and webpage view in the first rental area (or grid section) Y of the modified map for the retrieved period of time. In certain embodiments, the determination can be made by the data management module 144 or the routing/mapping module 148 and can be a summation of the number of application openings and accesses of the website that occurred from user devices 106*a-n* in the first rental area during the specified time frame.

At block 516, the vehicle location control server(s) 110 can determine the number of rental vehicles 102*a-n* within the first rental area Y and/or within a predetermine distance of the location of each user device 106*a-n* when it opened the rental vehicle application or accessed a rental vehicle website. For example, the determination can be made by the data management module 144 and/or the routing mapping module 148. In certain examples where the number of rental vehicles includes all rental vehicles 102*a-n* available for rental within the rental area Y, the number of rental vehicles can be a summation of all the rental vehicles 102*a-n* in the rental area Y. In other examples, the predetermined distance (e.g., any distance between 1 foot and 5 miles and preferably less than 1 mile) is retrieved, for example from the DBMS 146 and the data management module 144 or the routing/mapping module 148 determines the number of rental vehicles 102*a-n* available for rental and in their current position, that would have been within the predetermined distance of the user device 106*a-n* when it opened the rental vehicle application and/or accessed the rental vehicle website. In certain examples, the predetermine distance is a dynamic value that can change based on certain factors including, but not limited to special events (e.g., sporting events, concerts, conventions, parades, etc.) (which can be stored in the scheduling module 142) occurring within the rental area Y or within a predetermined distance from the rental area Y, holiday periods, time of day, traffic level, or similar events.

At block 518, an inquiry is conducted to determine if there are a sufficient number of rental vehicles within the rental area Y. In certain embodiments, the determination is made by the data management module 144 or the routing/mapping module 140 of the vehicle location control server(s) 110. In certain embodiments, the determination of whether there are enough rental vehicles 102*a-n* available for rent in the rental area Y is based on the distance between the location of the application openings and/or website accesses and the closest rental vehicle 102*a-n* to that location. The distance can be compared to a preset distance (e.g., anywhere in the range of 1 foot to 5 miles and more preferably less than 1 mile) to determine if the distance is greater than the preset distance. If the distance is greater than the preset distance, then the are not enough rental vehicles 102*a-n* in the rental area Y. If the distance is less than the preset distance, then there are enough rental vehicles 102*a-n* in the rental area Y.

In certain embodiments, the determination of whether there are enough rental vehicles 102*a-n* available for rent in the rental area Y is determined based on whether the number of rental vehicles 102*a-n* available for rent in the rental area Y is equal to or greater than a predetermined threshold number. Alternatively, the determination can be based on whether the percentage of rental vehicles 102*a-n* available for rent in the rental area Y as compared to the number of times that the rental vehicle application was opened and/or the rental vehicle website was accessed by a user device 106*a-n* during the retrieved time period is equal to or greater than a predetermined threshold percentage. In another embodiment, the determination of whether there are enough rental vehicles 102a-n available for rent in the rental area Y is determined based on whether the number of rental vehicles 102a-n within the predetermined distance of the location of user devices 106a-n when opening the rental vehicle application or accessing the rental vehicle website is greater than or equal to a predetermined threshold.

If there are, based on the predetermined thresholds, a sufficient number of rental vehicles 102a-n available for rent within the rental area Y, the YES branch can be followed to block 524. If there are not a sufficient number of rental vehicles 102a-n available for rent within the rental area Y, the NO branch can be followed to block 520. At block 520, the data management module 144 or another portion of the vehicle location control server(s) 110 can designate rental area Y as needing additional rental vehicles that are currently available for rent. For example, a designation can be associated with rental area Y and associated with the modified map in the DBMS 146 or the routing/mapping module 148. At block 522 the data management module 144 can employ the routing/mapping module 148 to identify specific locations within rental area Y to move a rental vehicle that is available for rental and can store these locations in association with rental area Y in memory 132. In certain embodiments, the specific locations can be identified as being within one mile or less than the location of one or more user devices 106a-n that opened the rental vehicle application or accessed the rental vehicle website during the predetermine period of time or historical time period. In certain embodiments, multiple locations may be identified for repositioning one or more rental vehicles 102a-n as certain areas or particular parking areas may not be available when the rental vehicle 102a-n is moved into the rental area Y.

At block 524, an inquiry is conducted to determine if there are too many rental vehicles within the rental area Y. In certain embodiments, the determination is made by the data management module 144 or the routing/mapping module 140 of the vehicle location control server(s) 110. In certain embodiments, the determination of whether there are too many rental vehicles 102a-n available for rent in the rental area Y is determined based on whether the number of rental vehicles 102a-n available for rent in the rental area Y or the percentage of rental vehicles 102a-n available for rent in the rental area Y as compared to the number of times that the rental vehicle application was opened and/or the rental vehicle website was accessed by a user device 106a-n during the retrieved time period is equal to or greater than a second predetermine threshold number or percentage. In another embodiment, the determination of whether there are too many rental vehicles 102a-n available for rent in the rental area Y is determined based on whether the number of rental vehicles 102a-n within the predetermined distance of the location of user devices 106a-n when opening the rental vehicle application or accessing the rental vehicle website is greater than or equal to a second predetermined threshold.

If there are not, based on the second set of predetermined thresholds, too many rental vehicles 102a-n available for rent within the rental area Y, the NO branch can be followed to block 530. If there are too many rental vehicles 102a-n available for rent within the rental area Y, the YES branch can be followed to block 526. At block 526, the data management module 144 or another portion of the vehicle location control server(s) 110 can designate rental area Y as needing fewer rental vehicles 102a-n than are currently available for rent (i.e., one or more rental vehicles 102a-n currently positioned in rental area Y can be sent instructions to move to another rental area). For example, a designation can be associated with rental area Y and associated with the modified map in the DBMS 146 or the routing/mapping module 148 that too many rental vehicles 102a-n are located within rental area Y and stored in memory 132. At block 528 the data management module 144 can employ the routing/mapping module 148 to identify specific rental vehicles 102a-n within rental area Y to move to another rental area if another rental area has too few rental vehicles 102a-n available for rent and can store identifying information for these rental vehicles 102a-n in association with rental area Y in memory 132.

At block 530 an inquiry is conducted to determine if there is another rental area Y to evaluate to determine if too few or too many rental vehicles 102a-n are within the particular rental area. In certain embodiments, the determination is made by the data management module and/or the routing/mapping module 148 of the vehicle location control server(s) 110. For example, the data management module 144 can determine if each divided section of the modified map has been evaluated. In certain examples, this process is iterative and the evaluation described in the process 500 can be continuously passing through each of the sections/areas of the modified map. If another rental area Y still needs to be evaluated, the YES branch can be followed to block 532, where the counter variable Y is incremented by 1. The process 500 can then return to block 514 to evaluate the rental vehicle inventory in the next rental area Y. Returning to the inquiry of 530, if there is not another rental area Y to evaluate, the NO branch can be followed to block 534.

At block 534, for each rental area Y needing additional rental vehicles 102a-n, the vehicle location control server(s) 110 can identify rental vehicles 102a-n to move to rental area Y. For example, the data management module 144 can evaluate the DBMS 146 or another portion of the memory 132 for the stored listing of rental vehicles 102a-n that can be moved from their particular rental areas due to overcapacity. In one example, the listing of rental vehicles 102a-n that can be moved from their particular rental areas due to overcapacity can be organized from greatest overcapacity to least overcapacity in the respective rental areas, and those rental vehicles 102a-n in the rental areas of greatest overcapacity can be moved first. Alternatively, the selection of which rental vehicle to move can be based on the rental vehicle 102a-n in a rental area of overcapacity that is closest in distance (or drive time) to the rental area Y needing additional rental vehicles 102a-n.

At block 536, the vehicle location control server(s) can generate and electronically transmit instructions for moving at least one rental vehicle 102a-n from a first rental area of overcapacity to rental area Y which has an under capacity of rental vehicles 102a-n. In certain examples, the instructions for moving can be electronically transmitted via the transceiver 150 and one or more of satellite 108, Wi-Fi 112, cellular or other known communications protocols to the vehicle computer 104 of one of the rental vehicles 102a-n. In certain examples, the instructions for moving can include a time for the rental vehicle 102a-n to conduct the move autonomously. For example, the server(s) 110 can evaluate current traffic patterns and traffic levels and can select a time to autonomously move the vehicle when traffic levels are anticipated to be light (e.g., late at night or early in the morning)). The location, or a series of optional locations, within the rental area Y for the vehicle to move to autonomously can be as specific as a particular parking spot or can more generally designate a street or parking lot to try to locate a spot on or along. Optionally, the instructions can additionally or alternatively include the driving path to take to move the rental vehicle 102a-n. In other examples, the instructions to move the rental vehicle 102a-n can be electronically transmitted to an employee of the rental company or a driving service that can drive the particular rental vehicle 102a-n from its current location to the second location within the rental area Y that has an under capacity of rental vehicles 102a-n.

At block 538, the movement instructions can be received electronically by the vehicle computer 104. For example, the movement instructions can be received by the data management module 128 via the transceiver 125. The movement instructions can provide sufficient information and authorization to allow the rental vehicle 102a-n to autonomously move, without the inclusion or assistance of a human passenger, from its current location to the location identified in the movement instructions. At block 540, the rental vehicle 102a-n can move from its current location (e.g., a rental area having an overcapacity of rental vehicles) to a second location within the rental area Y (a rental area having an under capacity of rental vehicles). In certain examples, movement of the rental vehicle 102a-n can be autonomously and can be controlled by the vehicle control system 123 based on information provided by the GPS system 121 and the one or more sensors 119. In other examples, movement of the rental vehicle can be completed by a human driver.

At block 542, once the rental vehicle 102a-n has reached its new location and the server(s) 110 determine (e.g., via GPS tracking by the GPS communications module 140) or receive electronic communication from the vehicle computer 104 that the rental vehicle 102a-n has reached its new location, the data management module 144 can access the scheduling module 142 and modify or verify that the designation for the rental vehicle 102a-n is that it is currently available for rental.

In addition to the process described above, the vehicle location control server(s) 110 can also optionally monitor the time period that each rental vehicle 102a-n has been located in a particular location or area without being rented, can compare that time period to a threshold time of nonuse, and can instruct the rental vehicle 102a-n to move from that location to another location, either within that particular rental area or in another rental area, if the time period is greater than the threshold time of nonuse. At block 544, the vehicle location control server(s) 110 can determine, for each rental vehicle 102a-n, the amount of time that the particular rental vehicle has been located in its current location or area without being rented. For example, the data management module 144 can access the scheduling module 142 to determine how long it has been since the rental vehicle 102a-n has been in its current location without being rented. At block 546, the data management module 144 or another portion of the vehicle location control server(s) can retrieve the threshold time of nonuse from memory 132. The threshold time for nonuse can be the same or different for all vehicles 102a-n and can be adjustable based on particular locations or special events within the rental areas. In the example, the data management module 144 can compare, for each rental vehicle 102a-n, the time it has been in its current location without being rented to the threshold time of nonuse to determine if the time the particular vehicle 102a-n has been in its current location is greater than the threshold time for nonuse.

At block 548, for each rental vehicle 102a-n for which the time it has been in its current location without rental is greater than the threshold time of nonuse, the vehicle location control server(s) 110 can evaluate the modified map of blocks 508-532 to determine a new location to move the rental vehicle 102a-n. In certain embodiments, the determination is made by the data management module 144 and/or the routing/mapping module 148. Movement of the rental vehicle 102a-n can be within the same rental area or into another rental area, and the particular areas can be selected based on the determination of under capacity/overcapacity in each rental area and/or other factors.

At block 550, the vehicle location control server(s) can generate and electronically transmit instructions for moving at least one rental vehicle 102a-n from its current location, where it has not been rented in too long of a time, to a new location. In certain examples, the instructions for moving can be electronically transmitted, via the transceiver 150 and one or more satellite 108, Wi-Fi 112, cellular or other known communications protocols, to the vehicle computer 104 of one of the rental vehicles 102a-n. In certain examples, the instructions for moving can include a time for the rental vehicle 102a-n to conduct the move autonomously (e.g., the server(s) 110 can evaluate current traffic patterns and traffic levels and can select a time to autonomously move the vehicle when traffic levels are anticipated to be light (e.g., late at night or early in the morning)), the location or a series of optional locations for the vehicle to move to autonomously (e.g., can be as specific as a particular parking spot or more generally can designate a street or parking lot to try and locate a spot on or along), and optionally the driving path to take to move the rental vehicle 102a-n. In other examples, the instructions to move the rental vehicle 102a-n can be electronically transmitted to an employee of the rental company or a driving service that can drive the particular rental vehicle 102a-n from its current location to the new location.

At block 552, the movement instructions can be received electronically by the vehicle computer 104. For example, the movement instructions can be received by the data management module 128 via the transceiver 125. The movement instructions can provide sufficient information and authorization to allow the rental vehicle 102a-n to autonomously move, without the inclusion or assistance of a human passenger, from its current location to the location identified in the movement instructions. At block 554, the rental vehicle 102a-n can move from its current location to the new location. In certain examples, movement of the rental vehicle 102a-n can be autonomously and can be controlled by the vehicle control system 123 based on information provided by the GPS system 121 and the one or more sensors 119. In other examples, movement of the rental vehicle 102a-n can be completed by a human driver.

At block 554, once the rental vehicle 102a-n has reached its new location and the server(s) 110 determine (e.g., via GPS tracking by the GPS communications module 140), or receive electronic communication from the vehicle computer 104, that the rental vehicle 102a-n has reached its new location, the data management module 144 can access the scheduling module 142 and modify or verify that the designation for the rental vehicle 102a-n is that it is currently available for rental. The process may continue to the END block.

In addition to reallocating rental vehicles to a zone that requires more rental vehicles, the autonomous movement of rental vehicles can be used to autonomously deliver a vehicle to a renter. For example, in addition to the other information provided by a user/renter when renting a vehicle, a user can provide a date and time that a vehicle to be rented is to be delivered to a particular location. Such information can then be stored in DBSM 146 and processed (e.g., in conjunction with 500) to adjust the location of a rental vehicle to a desired location of the user at the desired date and time.

One or more operations of the methods, process flows, or use cases of FIGS. 1-5B may have been described above as being performed by a user device, or more specifically, by one or more program module(s), applications, or the like executing on a device. It should be appreciated, however, that any of the operations of the methods, process flows, or use cases of FIGS. 1-5B may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5B may be described in the context of the illustrative devices, it should be appreciated that such operations may be implemented in connection with numerous other device configurations.

The operations described and depicted in the illustrative methods, process flows, and use cases of FIGS. 1-5B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other suitable device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

We claim:

1. A method for relocating autonomous vehicles of a plurality of autonomous vehicles available for use by certain individuals, the method comprising:
   providing a first hardware server including a first network interface;
   establishing, via said first network interface, a vehicle data connection between said first hardware server and each autonomous vehicle of said plurality of said autonomous vehicles;
   receiving vehicle location data associated with each autonomous vehicle of said plurality of autonomous vehicles via said vehicle data connections between said first hardware server and each autonomous vehicle of said autonomous vehicles;
   defining a first geographical region;
   providing a second hardware server including a second network interface;
   establishing, via said second network interface, a user data connection between said second hardware server and each user device of a plurality of user devices, each of said user devices being associated with a respective one of said certain individuals;
   receiving a first notification indicative of access to said second hardware server by said first user device, said first notification including user location data indicative of a first location of said first user device;
   storing said user location data indicative of said first location of said first user device;
   receiving, via said user data connections, a request to rent one of said plurality of autonomous vehicles from said first user device;
   identifying a number of autonomous vehicles located within a particular distance of said first user device responsive to receiving said request to rent one of said plurality of autonomous vehicles;
   identifying a first number of server accesses from within said first geographical region based at least in part on said first notification;
   determining a demand for said autonomous vehicles within said first geographical region, based at least in part on said first number of server accesses;
   determining a first number of said autonomous vehicles that are available within said first geographical region, based at least in part on said vehicle location information;
   determining whether said first number of the autonomous vehicles corresponds to said demand for said autonomous vehicles within said first geographical region;
   if said first number of the autonomous vehicles available within said first geographical region does not correspond to said demand for said autonomous vehicles within said first geographical region, communicating, from said first hardware server, movement instructions to a particular one of said autonomous vehicles, via a particular one of said network connections; and
   relocating, responsive to receiving said movement instructions, said particular one of said autonomous vehicles into or out of said first geographical region, thereby changing said first number of the autonomous vehicles available within said first geographical region to a second number of said autonomous vehicles available within said first geographical region, said second number of said available autonomous vehicles in said first geographical region corresponding more closely to said demand for said autonomous vehicles within said first geographical region than said first number of said available autonomous vehicles in said first geographical region; and wherein
   said first notification is received prior to receiving said request to rent one of said plurality of autonomous vehicles from said first user device.

2. The method of claim 1, further comprising:
receiving preference information associated with particular ones of said certain individuals associated with said user location information; and wherein
determining said demand for said autonomous vehicles within said first geographical region includes determining a demand for autonomous vehicles having a particular characteristic based at least in part on said preference information.

3. The method of claim 1, further comprising:
receiving time information associated with particular ones of said certain individuals associated with said user location information; and wherein
determining said demand for said autonomous vehicles within said first geographical region includes determining a demand for autonomous vehicles during a particular time period based at least in part on said time information.

4. The method of claim 3, wherein said particular time period is a recurring time period.

5. The method of claim 1, further comprising:
dividing a larger geographical region into a plurality of geographical regions including said first geographical region;
determining from said user location information a demand for autonomous vehicles within each geographical region of said plurality of geographical regions;
determining from said vehicle location information an available number of said autonomous vehicles within each geographical region of said plurality of geographical regions;
determining whether, within each particular geographical region of said plurality of geographical regions, said available number of said autonomous vehicles within each particular geographical region corresponds to said demand for said autonomous vehicles within that particular geographical region;
identifying a first subset of said plurality of geographical regions in which said available number of said autonomous vehicles is insufficient to meet said demand for said autonomous vehicles;
identifying a subset of said autonomous vehicles to relocate to at least one geographical region of said identified subset of said plurality of geographical regions; and
communicating movement instructions to said autonomous vehicles of said subset of autonomous vehicles to cause said autonomous vehicles of said subset of autonomous vehicles to move into one of said geographical regions of said first subset of geographical regions.

6. The method of claim 5, further comprising:
identifying a second subset of said plurality of geographical regions in which said available number of said autonomous vehicles exceeds said demand for said autonomous vehicles; and wherein
said step of identifying a subset of said autonomous vehicles to relocate to said first subset of said plurality of geographical regions includes selecting ones of said autonomous vehicles from within said second subset of geographical regions.

7. The method of claim 1, further comprising:
receiving a request for an autonomous vehicle at a particular location;
determining whether there is an available autonomous vehicle within a predetermined distance of said particular location; and
if there is not an available autonomous vehicle within a predetermined distance of said particular location, communicating movement instructions to a selected available one of said autonomous vehicles to cause said selected available one of said autonomous vehicles to move to a new location within said predetermined distance of said particular location.

8. The method of claim 7, wherein:
said step of receiving a request for an autonomous vehicle at a particular location includes receiving a request for an autonomous vehicle at a particular time; and
said movement instructions cause said selected available one of said autonomous vehicles to move to said new location within a predetermined time period prior to said particular time.

9. The method of claim 7, wherein:
said step of receiving a request for an autonomous vehicle at a particular location includes receiving a request for an autonomous vehicle having a particular characteristic; and
said selected available one of said autonomous vehicles is selected based at least in part on said particular characteristic.

10. A method for relocating an autonomous vehicle, said method comprising:
establishing a network connection with at least one user device;
receiving, at a hardware server associated with said autonomous vehicle, a request for said autonomous vehicle from said at least one user device via said network connection, said request including location information associated with said at least one user device;
determining a particular location based on said location information;
identifying available autonomous vehicles within a first predetermined distance of said particular location;
selecting a particular one of said identified available autonomous vehicles;
establishing a network connection with said selected autonomous vehicle;
providing, from said hardware server, relocation instructions to said selected autonomous vehicle via said network connection;
autonomously piloting, responsive to receiving said relocation instructions, said selected autonomous vehicle to a new location within a second predetermined distance of said particular location, said second predetermined distance being shorter than said first predetermined distance;
providing, from said hardware server, instructions to said selected autonomous vehicle to adjust from an autonomous mode to a non-autonomous mode, said non-autonomous mode allowing said autonomous vehicle to be driven by a human driver; and
switching, responsive to receiving said instructions, said autonomous vehicle from said autonomous mode to said non-autonomous mode.

11. The method of claim 10, further comprising:
responsive to receiving said request for an autonomous vehicle, providing a graphical representation of available autonomous vehicles within said first predetermined distance of said particular location to said user device; and wherein
said step of selecting a particular one of said identified available autonomous vehicles includes receiving information indicative of a selection of said particular one of said available autonomous vehicles from said user device.

12. The method of claim 10, wherein said step of identifying available autonomous vehicles within said first predetermined distance of said particular location includes:

identifying a set of autonomous vehicles within said first predetermined distance of said particular location; and identifying a subset of available autonomous vehicles from said set of autonomous vehicles.

13. The method of claim 12, further comprising modifying a status indicator of said selected autonomous vehicle to indicate that said selected autonomous vehicle is no longer available.

14. The method of claim 12, wherein:

said step of receiving a request for said autonomous vehicle from said at least one user device includes receiving a request for an autonomous vehicle having a particular characteristic; and said step of identifying a subset of available autonomous vehicles from said set of autonomous vehicles includes identifying a subset of available autonomous vehicles having said particular characteristic.

15. The method of claim 14, wherein said particular characteristic is a class of said available autonomous vehicles.

16. The method of claim 14, wherein said particular characteristic is a feature of said available autonomous vehicles.

17. The method of claim 10, wherein said location information is GPS data received from said user device.

18. The method of claim 10, wherein said location information is entered by a user of said user device.

19. The method of claim 10, wherein:

said request for said autonomous vehicle specifies a particular time period for renting said at least one autonomous vehicle; and said step of providing relocation instructions to said selected autonomous vehicle includes providing relocation instructions causing said autonomous vehicle to relocate to said new location within a predetermined time period prior to a starting time of said particular time period.

* * * * *